(12) United States Patent
Ogata et al.

(10) Patent No.: US 11,060,476 B2
(45) Date of Patent: Jul. 13, 2021

(54) INTERNAL COMBUSTION ENGINE CONTROL DEVICE

(71) Applicant: Hitachi Automotive Systems, Ltd., Hitachinaka (JP)

(72) Inventors: Kenichiroh Ogata, Hitachinaka (JP); Yoshinobu Arihara, Hitachinaka (JP); Hisahiro Ooba, Hitachinaka (JP); Takaki Itaya, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/337,546

(22) PCT Filed: Sep. 13, 2017

(86) PCT No.: PCT/JP2017/032968
§ 371 (c)(1),
(2) Date: Mar. 28, 2019

(87) PCT Pub. No.: WO2018/066328
PCT Pub. Date: Apr. 12, 2018

(65) Prior Publication Data
US 2020/0032735 A1    Jan. 30, 2020

(30) Foreign Application Priority Data

Oct. 3, 2016    (JP) .............................. JP2016-195446

(51) Int. Cl.
*F02D 41/30*    (2006.01)
*F02B 17/00*    (2006.01)
(Continued)

(52) U.S. Cl.
CPC ........ *F02D 41/3029* (2013.01); *F02B 17/005* (2013.01); *F02B 31/06* (2013.01);
(Continued)

(58) Field of Classification Search
CPC ................... F02B 17/005; F02D 15/02; F02D 2041/0015; F02D 2041/1431;
(Continued)

(56) References Cited

U.S. PATENT DOCUMENTS 4,233,944 A * 11/1980 Omori ..................... F02P 5/152
                                                              123/406.35
5,170,760 A    12/1992 Yamada
(Continued)

FOREIGN PATENT DOCUMENTS

JP    H4-179859 A    6/1992
JP    2000-297688 A    10/2000
(Continued)

OTHER PUBLICATIONS

JP 2000337235 English Translation.*
(Continued)

*Primary Examiner* — George C Jin
*Assistant Examiner* — Teuta B Holbrook
(74) *Attorney, Agent, or Firm* — Foley & Lardner LLP

(57) ABSTRACT

In an internal combustion engine which performs a homogeneous lean combustion mode and a stratified lean combustion mode, there is provided a new internal combustion engine control device capable of obtaining a stable combustion state by decreasing influences of delay of an air flow and a degree of change of a transient state and smoothly performing switching between the homogeneous lean combustion mode and the stratified lean combustion mode. Accordingly, in the present invention, when switching between the stratified lean mode in which a compression stroke injection is performed by a direct injection injector 7 and the homogeneous lean combustion mode in which an intake stroke injection is performed by the direct injection injector 7 is performed, a predetermined delay time Δt is provided from
(Continued)

at least a switching operation of a tumble control valve 6, a switching operation between the compression stroke injection and the intake stroke injection is performed, and the delay time Δt is set so as to correspond to a magnitude of the degree of change ΔL of the transient state. A switching timing between the compression stroke injection and the intake stroke injection is controlled according to the flow delay of an air control system such as the tumble control valve 6 and the degree of change ΔL of the transient state, and thus, it is possible to improve combustion stability in a combustion chamber.

10 Claims, 12 Drawing Sheets

(51) Int. Cl.
| | | |
|---|---|---|
| *F02B 31/06* | (2006.01) | |
| *F02B 75/04* | (2006.01) | |
| *F02D 37/02* | (2006.01) | |
| *F02D 41/34* | (2006.01) | |
| *F02M 35/10* | (2006.01) | |
| *F02M 61/14* | (2006.01) | |
| *F02P 5/04* | (2006.01) | |

(52) U.S. Cl.
CPC ............ *F02B 75/045* (2013.01); *F02D 37/02* (2013.01); *F02D 41/3094* (2013.01); *F02D 41/345* (2013.01); *F02M 35/10019* (2013.01); *F02M 35/10216* (2013.01); *F02M 35/10255* (2013.01); *F02M 35/10262* (2013.01); *F02M 61/145* (2013.01); *F02P 5/045* (2013.01); *F02D 2041/3052* (2013.01); *F02D 2200/602* (2013.01)

(58) Field of Classification Search
CPC ....... F02D 2041/3052; F02D 2200/602; F02D 37/02; F02D 41/0002; F02D 41/045; F02D 41/3029; F02D 41/3064; F02D 41/3094; F02D 41/345; F02P 5/15
See application file for complete search history.

(56) References Cited

U.S. PATENT DOCUMENTS

| | | | | |
|---|---|---|---|---|
| 6,044,831 A | * | 4/2000 | Takagi | ............... F02D 41/0032 123/698 |
| 6,178,943 B1 | * | 1/2001 | Taga | ...................... F02D 37/02 123/295 |
| 6,234,139 B1 | * | 5/2001 | Taga | ................... F02D 41/0002 123/295 |
| 6,318,083 B1 | * | 11/2001 | Machida | ................ F02D 23/00 60/601 |
| 6,510,835 B1 | * | 1/2003 | Mizuno | ................ F02D 41/123 123/295 |
| 2001/0002591 A1 | * | 6/2001 | Majima | ............... F02D 41/1498 123/406.24 |
| 2001/0015194 A1 | * | 8/2001 | Shiraishi | ............... F02B 17/005 123/301 |
| 2002/0020386 A1 | * | 2/2002 | Ogawa | ................. F02B 17/005 123/295 |
| 2005/0235958 A1 | * | 10/2005 | Matsumura | ......... F02D 41/3094 123/431 |
| 2006/0225703 A1 | * | 10/2006 | Saito | ..................... F02D 41/345 123/431 |
| 2007/0157604 A1 | * | 7/2007 | Kakuya | .................. F02M 27/04 60/285 |
| 2007/0169746 A1 | * | 7/2007 | Irisawa | ............... F02D 41/3094 123/431 |
| 2007/0250247 A1 | | 10/2007 | Yasui | |
| 2008/0017157 A1 | * | 1/2008 | Masuda | ................ F16F 15/126 123/192.2 |
| 2008/0066718 A1 | * | 3/2008 | Sato | .......................... F02D 9/02 123/350 |
| 2009/0118986 A1 | * | 5/2009 | Kita | .......................... F02P 5/06 701/105 |
| 2011/0088646 A1 | * | 4/2011 | Tanaya | ..................... F02P 5/15 123/179.3 |
| 2012/0216776 A1 | * | 8/2012 | Nagatsu | .............. F02D 13/0234 123/305 |
| 2012/0271533 A1 | * | 10/2012 | Shishime | ............ F02D 41/0025 701/105 |
| 2014/0261319 A1 | * | 9/2014 | Kimura | ................... F02P 15/08 123/406.45 |
| 2015/0275797 A1 | * | 10/2015 | Kojima | ................. B60W 20/40 701/22 |
| 2018/0363579 A1 | * | 12/2018 | Ogata | ................ F02D 41/0255 |

FOREIGN PATENT DOCUMENTS

| | | | |
|---|---|---|---|
| JP | 2000-337235 A | | 12/2000 |
| JP | 2000337235 A | * | 12/2000 |
| JP | 2003-293839 A | | 10/2003 |
| JP | 2005-337166 A | | 12/2005 |
| JP | 2007-247476 A | | 9/2007 |
| JP | 2009-024580 A | | 2/2009 |

OTHER PUBLICATIONS

International Search Report with English translation and Written Opinion issued in corresponding application No. PCT/JP2017/032968 dated Jan. 9, 2018.

* cited by examiner

FIG. 5A

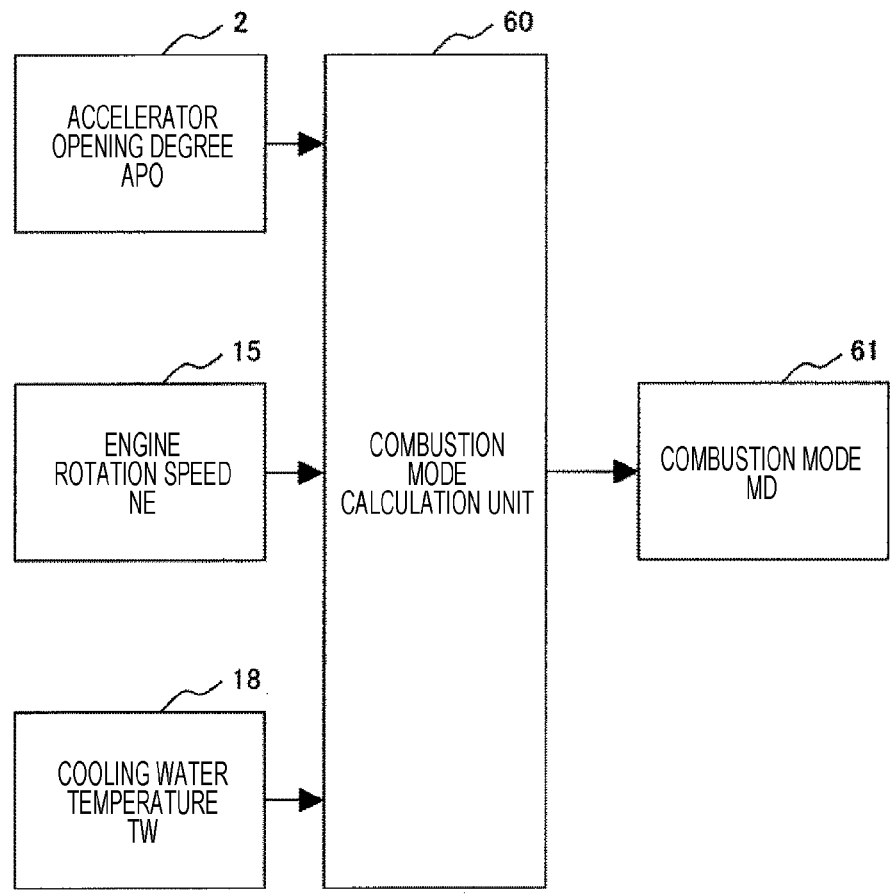

FIG. 5B

| ACCELERATOR OPENING DEGREE APO | - | <APOS <APOH <APOE | >APOS <APOH <APOE | >APOS >APOH <APOE | >APOS >APOH >APOE |
|---|---|---|---|---|---|
| INTERNAL COMBUSTION ENGINE ROTATION SPEED NE | - | <NES <NEH <NEE | >NES <NEH <NEE | >NES >NEH <NEE | >NES >NEH >NEE |
| COOLING WATER TEMPERATURE TW | TW<TL | TW>TL | TW>TL | TW>TL | TW>TL |
| COMBUSTION MODE MD | 0 | 1 | 2 | 3 | 4 |
| COMBUSTION | STOICHIOMETRIC | STOICHIOMETRIC | STRATIFIED | HOMOGENEOUS | STOICHIOMETRIC EGR |

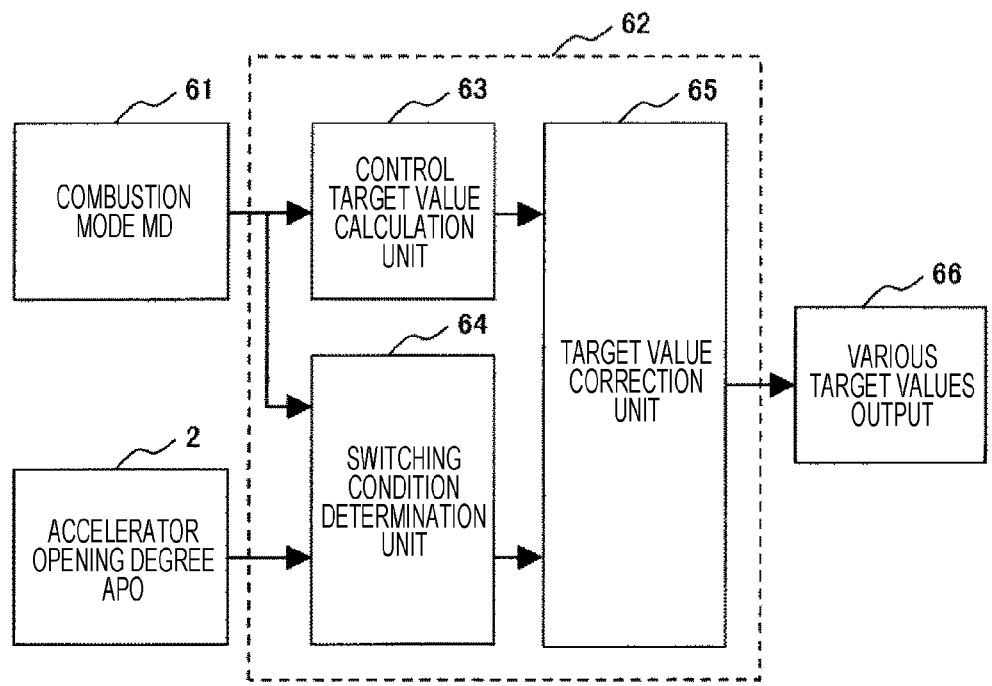

| COMBUSTION MODE MD | 1 ⇒ 2 | | 1 ⇒ 3 | | 2 ⇒ 3 | | 2 ⇒ 4 | | 3 ⇒ 4 | |
|---|---|---|---|---|---|---|---|---|---|---|
| CHANGE AMOUNT OF ACCELERATOR OPENING DEGREE APO | SMALL | LARGE | SMALL | LARGE | SMALL | LARGE | SMALL | LARGE | SMALL | LARGE |
| CORRECTION AMOUNT | SMALL | LARGE | SMALL | LARGE | SMALL | LARGE | SMALL | LARGE | SMALL | LARGE |

| COMBUSTION MODE MD | 2 ⇒ 1 | | 3 ⇒ 1 | | 3 ⇒ 2 | | 4 ⇒ 2 | | 4 ⇒ 3 | |
|---|---|---|---|---|---|---|---|---|---|---|
| CHANGE AMOUNT OF ACCELERATOR OPENING DEGREE APO | SMALL | LARGE | SMALL | LARGE | SMALL | LARGE | SMALL | LARGE | SMALL | LARGE |
| CORRECTION AMOUNT | SMALL | LARGE | SMALL | LARGE | SMALL | LARGE | SMALL | LARGE | SMALL | LARGE |

INTERNAL COMBUSTION ENGINE CONTROL DEVICE

TECHNICAL FIELD

The present invention relates to an internal combustion engine control device which controls an internal combustion engine mounted on an automobile or the like, and more particularly, to an internal combustion engine control device which performs switching between a stratified lean combustion mode and a homogeneous lean combustion mode and operates an internal combustion engine according to a combustion mode switching request during an operation of the internal combustion engine.

BACKGROUND ART

From the viewpoint of environmental conservation and energy saving, an internal combustion engine mounted on an automobile is required to have high efficiency and exhaust purification. In a method for achieving the high efficiency and exhaust purification, it is effective to improve combustion performed in a combustion chamber of the internal combustion engine, and as the method, a lean combustion method of combusting a mixture having an air-fuel mixing ratio which is leaner (hereinafter, referred to as lean) than a stoichiometric air-fuel ratio, an exhaust gas recirculation (hereinafter, referred to as EGR) combustion method of re-sucking an exhaust gas into a combustion chamber and diluting a mixture with the exhaust gas, or the like is known.

For example, in a recent combustion control method, a small amount of fuel is injected in a compression stroke at the time of a low load using an in-cylinder fuel injection valve (hereinafter, referred to as a direct injection injector) which directly injects a fuel into a combustion chamber, a stratified mixture is formed in the vicinity of a spark plug to perform stratified lean combustion so as to improve fuel consumption performance and exhaust purification performance. In addition, at the time of a medium load, a fuel is injected in an intake stroke such that a fuel injection amount increases compared to the stratified lean combustion, and a homogeneous mixture is formed throughout the entire combustion chamber to perform homogeneous lean combustion so as to improve operation performance in addition to the fuel consumption performance and the exhaust purification performance. Moreover, a required combustion mode is determined according to a load change or the like during an operation of the internal combustion engine, and a combustion mode is switched between the stratified lean combustion mode and the homogeneous lean combustion mode according to the required combustion mode.

Meanwhile, in order to perform the stratified lean combustion on the mixture in the combustion chamber, it is necessary to form the stratified mixture in the vicinity of the spark plug in the combustion chamber, and in order to form the stratified mixture, an opening degree of a tumble control valve provided in an intake port is set to a target opening degree for the stratified lean combustion, and a tumble flow suitable for the stratified lean combustion is formed in the combustion chamber. In this case, the tumble flow is weakly controlled to maintain the stratified mixture.

In addition, in homogeneous lean combustion, the opening degree of the tumble control valve is set to a target opening degree different from the target opening degree for the stratified lean combustion, and a tumble flow suitable for the homogeneous lean combustion is formed in the combustion chamber. In addition, the tumble flow is strongly controlled in order to obtain a homogeneous mixture.

For example, in JP 2003-293839 A (PTL 1), when the combustion mode is switched from the stratified lean combustion mode to the homogeneous lean combustion mode, the tumble control valve is set from an opening degree at which the stratified lean combustion can be performed to an opening degree at which the homogeneous lean combustion can be performed, and a fuel injection timing is switched from compression stroke injection in the stratified lean combustion to intake stroke injection in the homogeneous lean combustion.

CITATION LIST

Patent Literature

PTL 1: JP 2003-293839 A

SUMMARY OF INVENTION

Technical Problem

Meanwhile, in a region in which the combustion mode is switched, combustion stability of a combustion state in the combustion chamber deteriorates due to a change of an operation state or an environmental condition, and thus, there is a situation in which the fuel consumption performance or the exhaust purification performance provided in each combustion mode cannot be fully exerted. Specifically, a case where combustion stability deteriorates in a transient state in which a driver depresses an accelerator pedal or steps on the accelerator pedal frequently occurs.

This is because in the transient state, switching of a control state of an air control system such as the tumble control valve and switching of a control state of a fuel control system such as the direct injection injector are not appropriate. For example, if the air control system and the fuel control system are simultaneously switched from the stratified lean combustion mode to the homogeneous lean combustion mode, a flow of the air control system is delayed, and thus, there is a concern that the air-fuel ratio of the mixture in the combustion chamber does not become an appropriate air-fuel ratio. The same problem occurs in the case of switching of the opposite combustion mode.

In addition, the control states of the air control system and the fuel control system are not appropriate by a difference of magnitudes of degrees of change in the transient state, and particularly, a flow delay of the air control system increases as the degree of change increases, and thus, the combustion stability is largely affected. Accordingly, it is important to reduce the delay of the air flow and the influences of the degree of change in the transient state as much as possible to smoothly switch the combustion mode.

An object of the present invention is to provide a new internal combustion engine control device capable of obtaining a stable combustion state by reducing the delay of the air flow and influences of the degree of change in the transient state to smoothly performing switching between the homogeneous lean combustion mode and the stratified lean combustion in an internal combustion engine in which the homogeneous lean combustion mode and the stratified lean combustion mode are performed.

Solution to Problem

According to an aspect of the present invention, when switching between a stratified lean combustion mode in which a compression stroke injection is performed and a homogeneous lean combustion mode in which an intake stroke injection is performed is performed, a switching operation between the compression stroke injection and the intake stroke injection is performed after a predetermined delay time elapses from a switching operation of an air control system corresponding to the stratified lean combustion mode and the homogeneous lean combustion, and the delay time is set so as to correspond to a magnitude of a degree of change of a transient state.

Advantageous Effects of Invention

According to the present invention, a switching timing between a compression stroke injection and an intake stroke injection is controlled according to a flow delay of an air control system such as a tumble control valve and a magnitude of a degree of change of a transient state, and thus, it is possible to improve combustion stability in a combustion chamber.

BRIEF DESCRIPTION OF DRAWINGS

FIG. 5A is a diagram showing an arithmetic logic of a combustion mode MD.

FIG. 5B is an explanatory diagram explaining a determination result of the combustion mode MD by the arithmetic logic.

FIG. 7A is a diagram showing the control value arithmetic logic based on the combustion mode MD and an accelerator opening degree information APO.

FIG. 7B is an explanatory diagram explaining a correction amount in a transient state of the control value arithmetic logic.

DESCRIPTION OF EMBODIMENTS

An embodiment of the present invention will now be described in detail with reference to the drawings. However, the present invention is not limited to the following embodiment, and the present invention includes various modification examples and application examples within a technical concept of the present invention.

Figure 1:
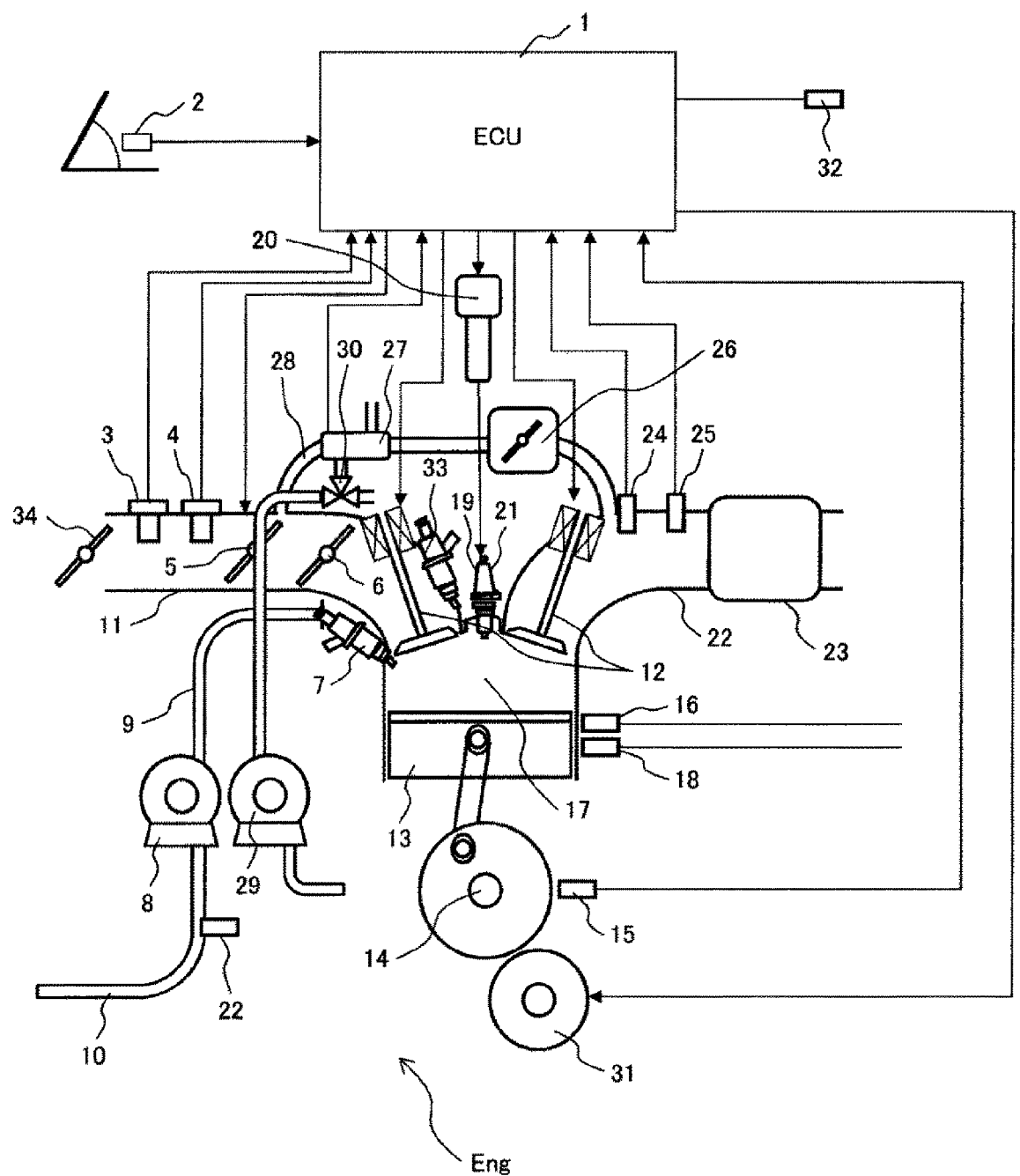
FIG. 1 is a configuration diagram of an internal combustion engine control system of an automobile to which the present invention is applied.

Hereinafter, a configuration and an operation of an internal combustion engine control device according to the embodiment of the present invention will be described with reference to FIGS. 1 to 12. First, FIG. 1 shows a configuration of an internal combustion engine system according to the present embodiment.

An internal combustion engine Eng is a spark ignition type internal combustion engine and an internal combustion engine capable of performing "stoichiometric combustion", "EGR combustion", and "lean combustion" as a combustion method. An air flow sensor 3 which measures an intake air amount, a throttle 5 which adjusts an intake pipe pressure, an intake air temperature/humidity sensor 4 which is an aspect of an intake air temperature/humidity detector and measures a temperature and humidity of intake air, a tumble control valve 6 which changes an area in an intake pipe, an intake pipe length adjustment valve 34 which constitutes an intake pipe length changing mechanism, and a port injector 33 are provided at each appropriate position of an intake pipe 11. Here, for example, the intake pipe length adjustment valve 34 selectively opens and closes the intake pipe 11 in which the intake pipe 11 is divided into long and short dual systems on an upstream side of the intake air temperature/humidity sensor 4.

Moreover, in the present embodiment, an internal combustion engine which does not include the port injector 33 may be used, and the internal combustion engine may include any one of the intake pipe length adjustment valve 34 and the tumble control valve 6. Moreover, in the intake pipe length adjustment valve 34, an intake pipe length may be lengthened when the intake pipe length adjustment valve 34 is closed or the intake pipe length may be lengthened when the intake pipe length adjustment valve 34 is opened, and a change of the intake pipe length by opening and closing of the intake pipe length adjustment valve 34 may have an opposite characteristic depending on a layout of the internal combustion engine system. Moreover, the air flow sensor 3 may be used as an intake air pressure sensor.

The internal combustion engine Eng includes a direct injection injector 7 which directly injects a fuel into a combustion chamber 17 and a spark plug 19 which supplies spark energy, and a variable valve mechanism 12 which adjusts an inflow time of the intake air flowing into the combustion chamber 17 or an outflow time of an exhaust gas flowing out from the combustion chamber 17 is provided at each appropriate position of the internal combustion engine Eng.

The variable valve mechanism 12 can change a period in which an intake valve and an exhaust valve are opened or an opening/closing timing, and the variable valve mechanism 12 may be provided on only the intake valve side. In addition, an actual compression ratio can be changed by changing the closing timing of the intake valve, and it is possible to change a pressure and temperature in the combustion chamber.

A common rail 9 which is connected to the direct injection injector 7 to supply the fuel, a fuel pump 8 for feeding the fuel to the common rail 9, and a fuel pipe 10 through which the fuel is supplied to the fuel pump 8 are provided at each appropriate position of the internal combustion engine Eng. Moreover, a fuel pressure sensor which is an aspect of a fuel pressure detector and measures a pressure of the fuel is provided at an appropriate position of the common rail 9. Here, the fuel pressure sensor may be a fuel temperature sensor. The spark plug 19 is connected to an ignition coil 20, and the ignition energy and the number of ignitions are controlled by the ignition coil 20. The ignition coil 20 may be controlled by a separate control device.

Moreover, a three-way catalyst 23 which purifies the exhaust gas, an exhaust temperature sensor 24 which is an aspect of an exhaust temperature detector and measure a temperature of the exhaust gas on an upstream side of the three-way catalyst 23, an air-fuel ratio sensor 25 which is an aspect of an air-fuel ratio detector and detects the air-fuel ratio of the exhaust gas on the upstream side of the three-way catalyst 23, and an exhaust recirculation pipe 28 which is connected to the intake pipe 11 are provided at each appropriate position of the exhaust pipe 22. The air-fuel ratio sensor 25 may be an oxygen concentration sensor.

Moreover, an EGR valve 26 which regulates an exhaust recirculation rate and an EGR cooler 27 which is an aspect of a recirculation gas temperature detector and adjusts a temperature of a recirculated gas are provided at appropriate positions of the exhaust recirculation pipe 28. In addition, the EGR cooler 27 has an inlet/outlet of cooling water for adjusting the temperature of the recirculated gas, and a cooling water pump 29 for controlling a flow rate of the cooling water and a cooling water flow path switching valve 30 are provided at each appropriate position of the internal combustion engine Eng.

In addition, a piston stroke changing mechanism is provided, a crankshaft 14 includes a main shaft and a sub shaft, and the sub shaft is connected to a piston 13 via a connecting rod. Here, a control shaft 31 is provided, which changes a distance between the main shaft and the sub shaft or a length of the connection rod.

The piston stroke changing mechanism is provided, and thus, it is possible to change a stroke amount of the piston and change the pressure and temperature in the combustion chamber. Moreover, a mechanism which changes the stroke amount of the piston is not limited to the above-described mechanism.

The crankshaft 14 includes a crank angle sensor 15 for detecting an angle and a rotational speed of the crankshaft 14 and a movement speed of the piston 13. In addition, the internal combustion engine Eng includes a knock sensor 16 for detecting a vibration of the internal combustion engine Eng as an acceleration. Moreover, a pressure sensor 21 which detects the pressure inside the combustion chamber is provided at an appropriate position of the internal combustion engine Eng. The pressure sensor 21 may be an ion current sensor which detects an ion amount of the combustion chamber.

In addition, a cooling water temperature sensor 18 which detects a temperature of the cooling water inside the internal combustion engine Eng is provided at an appropriate position of the internal combustion engine Eng. Various information obtained from the air flow sensor 3, the intake air temperature/humidity sensor 4, the crank angle sensor 15, the knock sensor 16, the cooling water temperature sensor 18, the pressure sensor 21, the exhaust temperature sensor 24, the air-fuel ratio sensor 25, and the EGR cooler 27 which is an aspect of the recirculation gas temperature detector and adjusts the temperature of the recirculated gas is sent to an electronic control means 1.

Moreover, accelerator opening degree information obtained from an accelerator pedal opening degree sensor 2 is sent to the electronic control means 1. The accelerator pedal opening degree sensor 2 detects a depression amount of the accelerator pedal, that is, an accelerator opening degree. The electronic control means 1 calculates a required torque based on the accelerator opening degree information of the accelerator pedal opening degree sensor 2. That is, the accelerator pedal opening degree sensor 2 is used as a required torque detection sensor which detects the required torque with respect to the internal combustion engine Eng.

Based on output information of the crank angle sensor 15, the electronic control means 1 calculates the angle and the rotational speed of the crankshaft 14 and the movement speed of the piston 13. In addition, based on an operation state of the internal combustion engine Eng obtained from the outputs of various sensors, the electronic control means 1 calculates a main operation amount of the internal combustion engine Eng such as opening degree information of the throttle 5, opening degree information of the tumble control valve 6, injection information of the direct injection injector 7, drive information of the fuel pump 8, valve opening/closing timing information of the variable valve mechanism 12, ignition control information of the ignition coil 20, opening degree information of the EGR valve 26, cooling water control information of the cooling water pump 29 and the cooling water switching valve, piston stroke information of the control shaft which controls the piston stroke amount, switching information of the intake pipe length adjustment valve 34, or injection information of the port injector 33.

The throttle opening degree information calculated by the electronic control means 1 is sent to the throttle 5 as the throttle drive information, the tumble control valve opening degree information calculated by the electronic control means 1 is sent to the tumble control valve 6 as the tumble control valve drive information, and the injection information calculated by the electronic control means 1 is converted into a direct injection injector opening valve pulse signal and is sent to the direct injection injector 7. Moreover, the injection information is converted into a port injector opening valve pulse signal and is also sent to the port injector 33.

Similarly, the fuel pump drive signal calculated by the electronic control means 1 is sent to the fuel pump 8, the valve opening/closing timing information calculated by the electronic control means 1 is sent to the variable valve mechanism 12 as a variable valve drive signal, the ignition control information calculated by the electronic control means 1 to instruct ignition once or a plurality of times is sent to the ignition coil 20, the EGR valve opening degree information calculated by the electronic control means 1 is sent to the EGR valve 26 as an EGR valve drive signal, and the cooling water control information calculated by the electronic control means 1 is sent to the cooling water pump 29 and the cooling water flow path switching valve 30 as a cooling water control drive signal.

A fuel is injected to a mixture of the air flowing into the combustion chamber 17 from the intake pipe 11 through the intake valve and the recirculated gas recirculated from the exhaust pipe 22 via the EGR valve 26 and the EGR cooler 27, and thus, a combustible mixture is formed. The combustible mixture is combusted by a spark generated from the spark plug 19 supplied with the ignition energy or the number of ignitions by the ignition coil 20 at a predetermined ignition timing, the piston 13 is pressed by a combustion pressure, and thus, a driving force of the internal combustion engine Eng is generated. After explosion, the exhaust gas is sent to the three-way catalyst 23 via the exhaust pipe 22, and harmful exhaust components are discharged after being purified in the three-way catalyst 23.

Target piston stroke information calculated by the electronic control means 1 is sent to the control shaft 31. The internal combustion engine Eng is mounted on the automobile, and information on a traveling state of the automobile is sent to electronic control means 1. Moreover, information on a vehicle speed sensor which is attached to a vehicle body on which the internal combustion engine is mounted or a wheel, information on a sensor (hereinafter, referred to as a G sensor) which measures an acceleration, an angle, or the like, and information on a shift lever position sensor which detects a position of a shift lever for controlling a transmission attached to the vehicle body on which the internal combustion engine is mounted are directly input to the electronic control means 1 or are input to the electronic control means 1 from a different control device.

Figure 2:
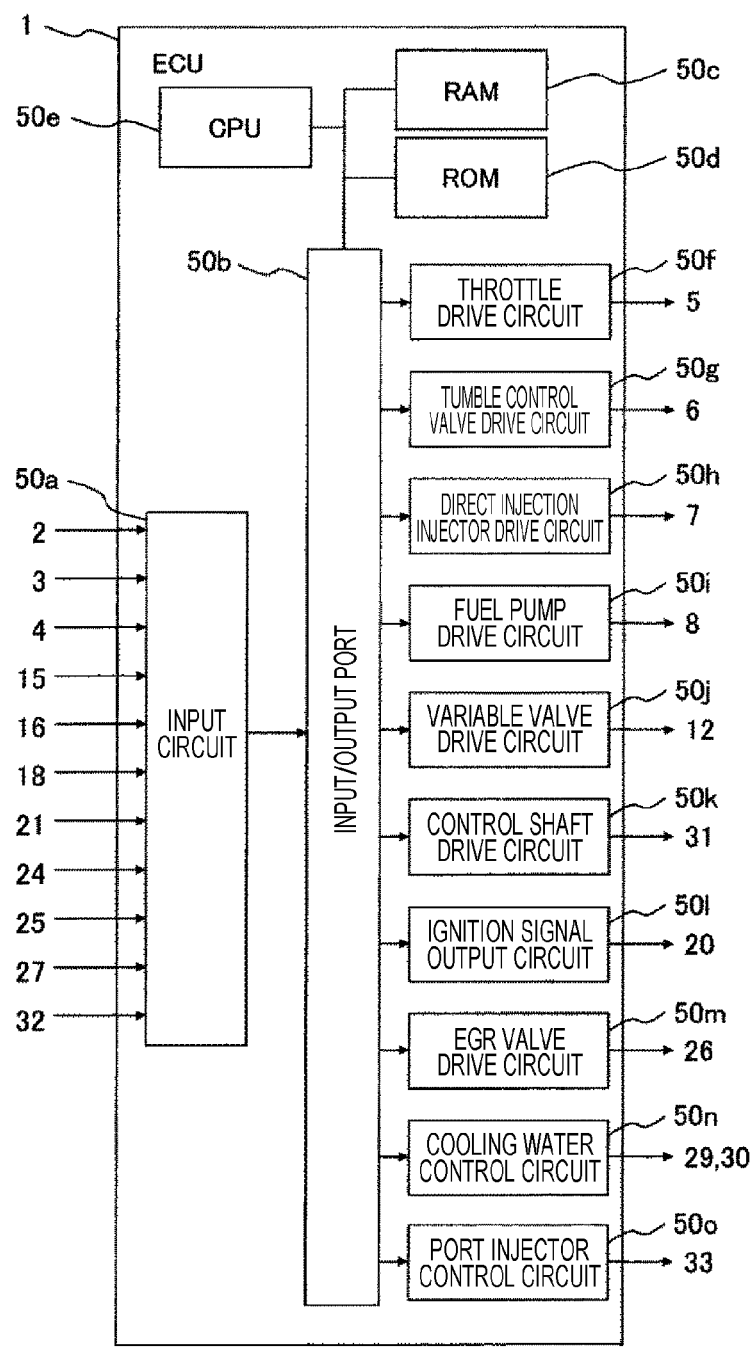
FIG. 2 is a block diagram showing a configuration of an electronic control means shown in FIG. 1.

FIG. 2 is a system block diagram showing a configuration of the electronic control means 1 according to the embodiment of the present invention. Output information from the accelerator pedal opening degree sensor 2, the air flow sensor 3, the intake air temperature/humidity sensor 4, the crank angle sensor 15, the knock sensor 16, the cooling water temperature sensor 18, the pressure sensor 21, the exhaust temperature sensor 24, the air-fuel ratio sensor 25, the recirculation gas temperature detector 27 provided in the EGR cooler, and the G sensor 32 is input to an input circuit 50a of the electronic control means 1. However, the input information is not limited to these.

The input information of each sensor is sent to an input/output port in the input/output port 50b.

A value sent to the input/output port 50b is stored in a RAM 50c and is arithmetic processed by a CPU 50e. A control program which describes contents of the arithmetic processing is written in a ROM 50d in advance.

A value indicating an operation amount of each actuator calculated according to the control program is stored in the RAM 50c, and thereafter, is sent to the output port of the input/output port 50b so as to be sent to each actuator via each drive circuit.

In the case of the present embodiment, as the drive circuit, there are a throttle drive circuit 50f, a tumble control valve drive circuit 50g, a direct injection injector drive circuit 50h, a fuel pump drive circuit 50i, a variable valve drive circuit 50j, a control shaft drive circuit 50k, an ignition signal output circuit 50l, an EGR valve drive circuit 50m, a cooling water control drive circuit 50n, and a port injector drive circuit 50o. Each circuit controls the throttle 5, the tumble control valve 6, the direct injection injector 7, the fuel pump 8, the variable valve mechanism 12, the control shaft 31, the ignition coil 20, the EGR valve 26, the cooling water pump or the cooling water flow path switching valve 30, and the port injector 33. The control device of the present embodiment is a device in which a drive circuit is provided in the electronic control means 1. However, the present invention is not limited to this, and any one of the drive circuits may be provided in the electronic control means 1.

Figure 3:
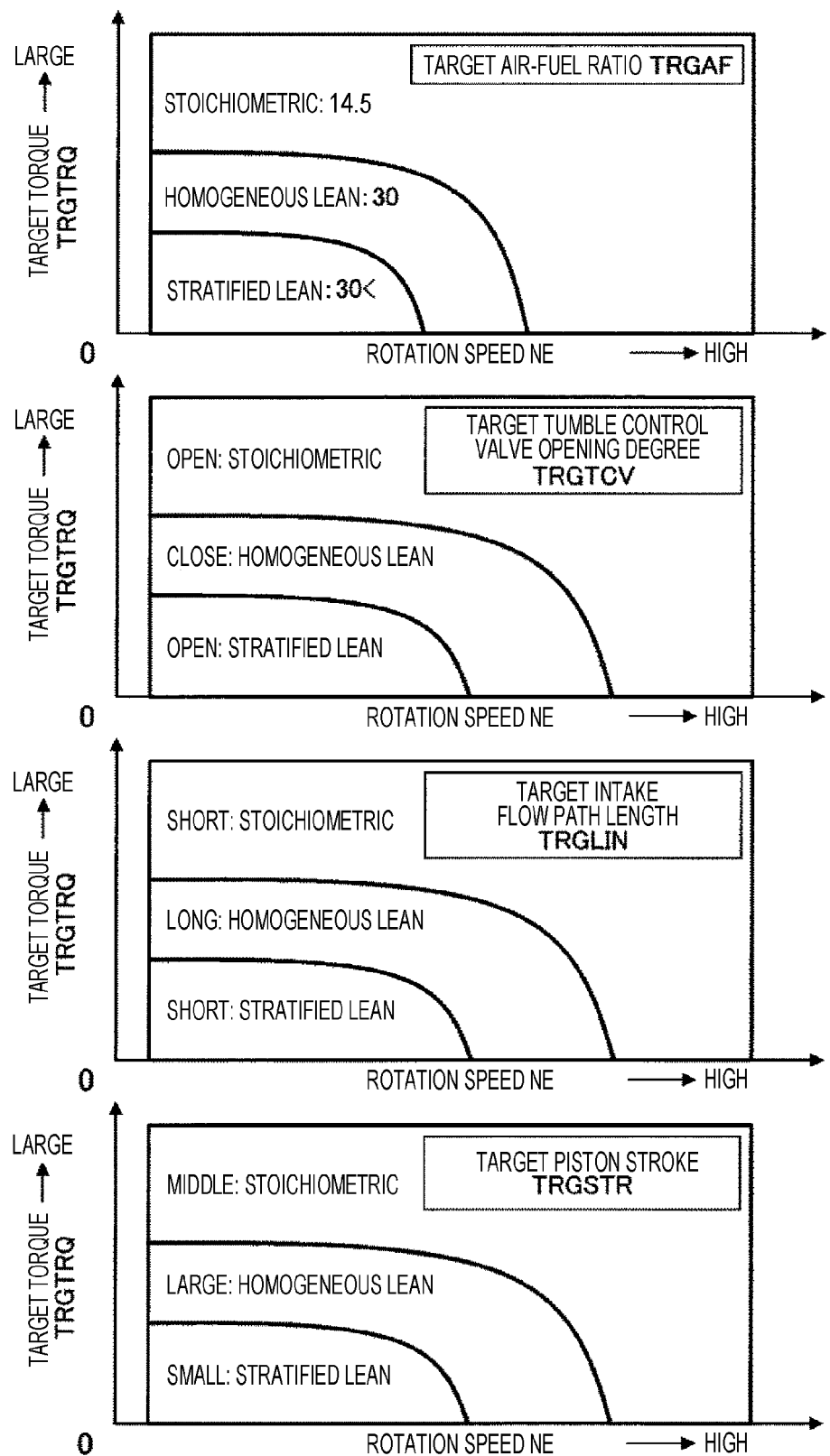
FIG. 3 is a control map of a target air-fuel ratio characteristic, a target tumble control valve opening degree characteristic, a target intake flow path length characteristic, and a target piston stroke characteristic corresponding to a rotation speed and a target torque of an internal combustion engine.

FIG. 3 shows a control map of an air control system corresponding to a rotation speed and a target torque (=accelerator pedal opening degree) of the internal combustion engine according to the embodiment of the present invention. A vertical axis of each target control map indicates a target torque TRGTRQ and a horizontal axis indicates a rotation speed NE of the internal combustion engine. From a top from FIG. 3, a target air-fuel ratio TRGAF, a target tumble control valve opening degree TRGTCV, a target intake flow path length TRGLIN, and a target piston stroke TRGSTR are shown. In addition, the target air-fuel ratio TRGAF is set to be changed in accordance with the rotation speed NE and the target torque TRGTRQ. For example, the target air-fuel ratio TRGAF is set to be leaner than the air-fuel ratio 30 in a stratified lean combustion mode, the target air-fuel ratio TRGAF is set to the air-fuel ratio 30 in a homogeneous lean combustion mode, and the target air-fuel ratio TRGAF is set to the air-fuel ratio 14.5 in a stoichiometric combustion mode. Here, since the target air-fuel ratio TRGAF is changed depending on flow characteristics, homogeneity characteristics, or the like of the internal combustion engine to be applied, the target air-fuel ratio TRGAF may be arbitrarily set.

According to the rotation speed NE and the target torque TRGTRQ corresponding to the stratified lean combustion mode, the homogeneous lean combustion mode, and the stoichiometric combustion mode, the target tumble control valve opening degree TRGTCV, the target intake flow path length TRGLIN, the target piston stroke TRGSTR, and the like have respective control target values.

For example, the target tumble control valve opening degree TRGTCV is set to be an "open state" in the stratified lean combustion mode, to be a "closed state" in the homogeneous lean combustion mode, and to be the "open state" in the stoichiometric combustion mode. As a result, in the homogeneous lean combustion mode, the tumble control valve is closed such that the flow of the mixture in the combustion chamber is strengthened (strongly flows) and combustion stabilization is obtained. In the stratified lean combustion mode, the tumble control valve is opened such that the flow of the mixture is weakened (weakly flow) and the combustion stabilization is obtained, and in the stoichiometric combustion mode, the tumble control valve is opened such that the flow of the mixture is weakened (weakly flows), and optimum flow characteristics are obtained.

In addition, the target intake flow path length TRGLIN is set to be short in the stratified lean combustion mode, to belong in the homogeneous lean combustion mode, and to be short in the stoichiometric combustion mode. Accordingly, optimum flow characteristics of the mixture can be provided in the homogeneous lean in which the combustion stabilization is obtained by the strong flow and the stratified lean combustion in which the combustion stabilization is obtained by the weak flow. In addition, a favorable response characteristic with no air response delay can be obtained at the time of a high-load stoichiometric combustion mode.

Here, in the flow path, flow performance may be opposite to each other according to the characteristics of the applied internal combustion engine, and thus, in this case, long and short may be reversed to each other.

In addition, the target piston stroke TRGSTR is set to be short in the stratified lean combustion mode, to be large in the homogeneous lean combustion mode, and to be intermediate in the stoichiometric combustion mode. Accordingly, optimum flow characteristics of the mixture can be provided in the homogeneous lean in which the combustion stabilization is obtained by the strong flow and the stratified lean combustion in which the combustion stabilization is obtained by the weak flow. In addition, high filling efficiency can be secured at the time of the high-load stoichiometric combustion mode, and the response can be controlled to a response having favorable characteristics.

In addition, the air control system shows the tumble control valve, an intake flow path length, and a piston stroke. However, many tumble control valves are adopted, and thus, it is more practical to control at least the tumble control valve.

By setting the above-described control target values, the target air-fuel ratio is set to be a lean side while the combustion stabilization is realized in each of the stratified lean combustion mode in which the target air-fuel ratio is set to be leaner and the homogeneous lean combustion mode in which the target air-fuel ratio is set to be richer than the target air-fuel ratio in the stratified lean combustion mode, and thus, it is possible to improve exhaust gas purification performance and fuel consumption performance.

Figure 4:
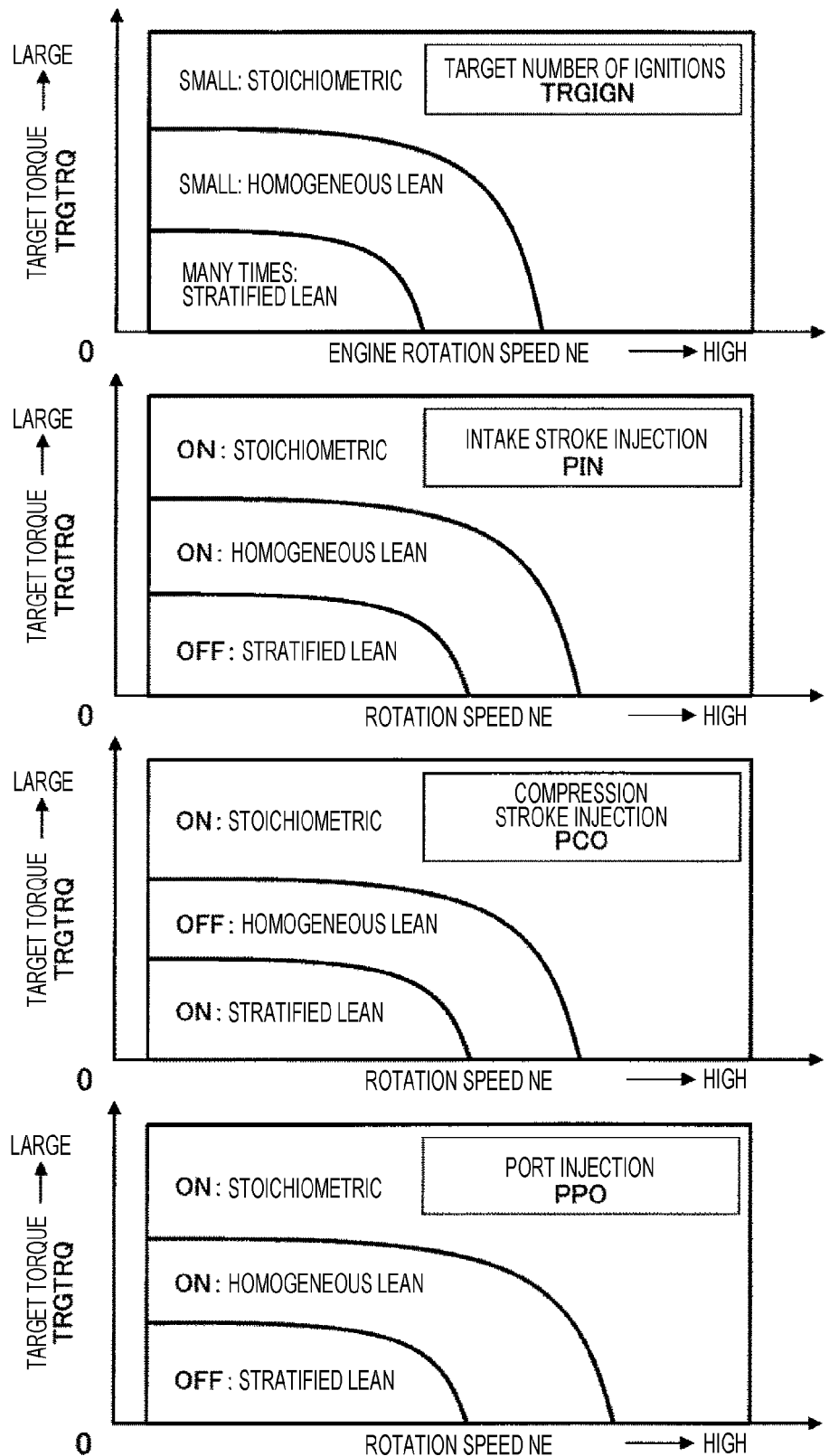
FIG. 4 is a control map of a target ignition frequency characteristic, an intake stroke injection characteristic, a compression stroke injection characteristic, and a port injection characteristic corresponding to the rotation speed and the target torque of the internal combustion engine.

In addition, FIG. 4 shows a control map of a fuel control system corresponding to the rotation speed and the target torque according to the embodiment of the present invention. A vertical axis of each target control map indicates the target torque TRGTRQ and a horizontal axis indicates the rotation speed NE of the internal combustion engine. From a top from FIG. 4, the target number of ignitions TRGIGN, an intake stroke injection PIN, a compression stroke injection PCO, and a port injection PPO are shown. In addition, according to the internal combustion engine system to be applied, the target control map of the port injection PPO may not exist, and the target number of ignitions TRGIGN may be target ignition energy or a target ignition coil charging time DWELL.

According to the rotation speed NE and the target torque TRGTRQ corresponding to the stratified lean combustion mode, the homogeneous lean combustion mode, and the stoichiometric combustion mode, the target number of ignitions TRGIGN, the intake stroke injection PIN, the compression stroke injection PCO, the port injection PPO, and the like have the respective control target values.

For example, the target number of ignitions TRGIGN is set so as to be increased in the stratified lean combustion mode, to be decreased in the homogeneous lean combustion mode, and to be decreased also in the stoichiometric combustion mode. Accordingly, in the homogeneous lean in which the combustion stabilization is obtained by the strong flow, it is possible to increase input energy per ignition by decreasing the number of ignitions, it is possible to prevent discharging from being eliminated at the time of the strong flow, and it is possible to improve ignitability.

In addition, in the stratified lean combustion mode in which the combustion stabilization is obtained by the weak flow, the number of ignitions increases, and thus, it is possible to provide a plurality of times of ignition opportunity to a cycle variation of the stratified mixture existing around the spark plug, and it is possible to improve the ignitability by improving the robustness of ignition.

In this way, an optimum ignition control can be provided to the stratified lean combustion mode and the homogeneous lean combustion mode. In addition, even in a case where the control is performed by the ignition energy or the ignition coil charging time DWELL instead of the number of ignitions, in the homogeneous lean combustion mode, the ignition energy increases to be more than that of the stratified lean combustion mode, and thus, similar ignitability improvement effect can be obtained.

The controls of the direct injection injector 7 and the port injector 33 will be described. For example, in the direct injection injector 7, the intake stroke injection PIN is set to OFF in the stratified lean combustion mode, to ON in the homogeneous lean combustion mode, and to ON in the stoichiometric combustion mode. Meanwhile, in the compression stroke injection PCO is set to ON in the stratified lean combustion mode, to OFF in the homogeneous lean combustion mode, and to ON in the stoichiometric combustion mode.

Accordingly, by performing the intake stroke injection in the homogeneous lean combustion mode, it is possible to finish the fuel injection at an early stage in the cycle, and thus, a high homogeneous mixture formation is possible, and combustion stabilization can be obtained. In addition, in the stratified lean combustion mode, a diffusion time of the fuel is shortened by performing the compression stroke injection, and thus, a favorable formation of the stratified mixture around the spark plug is obtained, and the combustion stabilization can be obtained.

In addition, by performing the intake stroke injection in the stoichiometric combustion mode, it is possible to perform a highly homogeneous mixture formation by carrying out the fuel injection at an early stage in the cycle, and the combustion chamber is cooled by the compression stroke injection following the intake stroke injection, and thus, it is possible to suppress an abnormal combustion called knocking, in which a fuel remaining on an ends of the combustion chamber is self-ignited.

Next, in the port injector 33, the port injection PPO is set to OFF in stratified lean combustion mode, to ON in the homogeneous lean combustion mode and, to ON in the stoichiometric combustion mode. Accordingly, similar effects to those of the above-described intake stroke injection PIN, it is possible to obtain a highly homogeneous mixture formation compared to an internal combustion engine system having only the direct injection injector 7, and thus, it is necessary to increase improvement effects of the exhaust purification performance and the fuel consumption performance.

However, a case where the internal combustion engine system does not have a port injector is not limited to the above-described case. That is, instead of the port injection PPO, an increase in the number of split injections in the intake stroke injection PIN of the direct injection injector 7, an increase in a fuel injection pressure, and optimization of an injection start timing are added, and thus, it is possible to obtain effects similar to the case where the port injector 33 is used.

FIG. 5A shows an arithmetic logic which calculates the combustion mode, and FIG. 5B is a determination table which determines a combustion mode MD. Moreover, a determination calculation of the combustion mode MD is carried out inside the electronic control means 1. The arithmetic logic shown in FIG. 5A is expressed as a control function and is actually executed by a control program of a microcomputer provided in the electronic control means 1.

In FIG. 5A, accelerator opening degree information APO from the accelerator pedal opening degree sensor 2, the rotation speed information NE of the internal combustion engine from the crank angle sensor 15, and cooling water temperature information TW from the cooling water temperature sensor 18 are input to a combustion mode calculation unit 60. In the combustion mode calculation unit 60, the combustion mode MD is calculated based on a combustion mode determination table shown in FIG. 5B and is output.

Next, a combustion table determination table will be described. First, in a case where the cooling water temperature information TW is lower than a permission condition temperature TL stored in the combustion mode calculation unit 60 in advance, the combustion mode MD becomes a "MD=0" mode and is determined such that the stratified lean combustion and the homogeneous lean combustion are not performed and the stoichiometric combustion is performed. This state indicates that the internal combustion engine is in a cold state, and is set to a stoichiometric combustion mode for performing a stable combustion. The calculated combustion mode MD is set in a mode setting unit 61.

In addition, even when the internal combustion engine has warmed up and the cooling water temperature information TW is equal to or higher than the permission condition temperature TL, in a case where the accelerator opening degree information APO is less than a stratified lean permission condition APOS, a homogeneous lean permission condition APOH, and a stoichiometric EGR permission condition APOE stored in the combustion mode calculation unit 60 and/or a case where the rotation speed information NE is less than the stratified lean permission condition NES, the homogeneous lean permission condition NEH, and the stoichiometric EGR permission condition NEE stored in the combustion mode calculation unit 60, the combustion mode MD becomes a "MD=1" mode and is determined such that the stratified lean combustion and the homogeneous lean combustion are not performed and the stoichiometric combustion is performed.

Moreover, in a case where the cooling water temperature information TW is equal to or higher than the permission condition temperature TL, when the accelerator opening degree information APO and the rotation speed information NE are above the stratified lean permission conditions APOS and NES, the combustion mode MD becomes a "MD=2" mode and is determined such that the stratified lean combustion is performed.

In addition, in a case where the cooling water temperature information TW is equal to or higher than the permission condition temperature TL, when the accelerator opening degree information APO and the rotation speed information NE are above the stratified lean permission conditions APOS and NES and the homogeneous lean permission conditions APOH and NEH, the combustion mode MD becomes a "MD=3" mode and is determined such that the homogeneous lean combustion is performed.

Moreover, in a case where the cooling water temperature information TW is equal to or higher than the permission condition temperature TL, when the accelerator opening degree information APO and the rotation speed information NE are above the stratified lean permission conditions APOS and NES, the homogeneous lean permission conditions APOH and NEH, and the stoichiometric EGR permission conditions APOE and NEE, the combustion mode MD becomes a "MD=4" mode and is determined such that the stoichiometric EGR combustion is performed.

In this way, by using the cooling water temperature, an intake air temperature, an exhaust temperature, a lubricating oil temperature, or the like indicating an engine temperature condition, it is possible to provide an appropriate lean combustion permission condition and a combustion permission determination corresponding to an acceleration or deceleration requirement or a vehicle speed of a driver can be performed from the accelerator opening degree or the rotation speed, and it is possible to appropriately select a combustion aspect for improving the fuel consumption performance and the exhaust purification performance of the internal combustion engine in the stoichiometric combustion mode, the stratified lean combustion mode, the homogeneous lean combustion mode, the stoichiometric EGR combustion mode, or the like.

Figure 6:
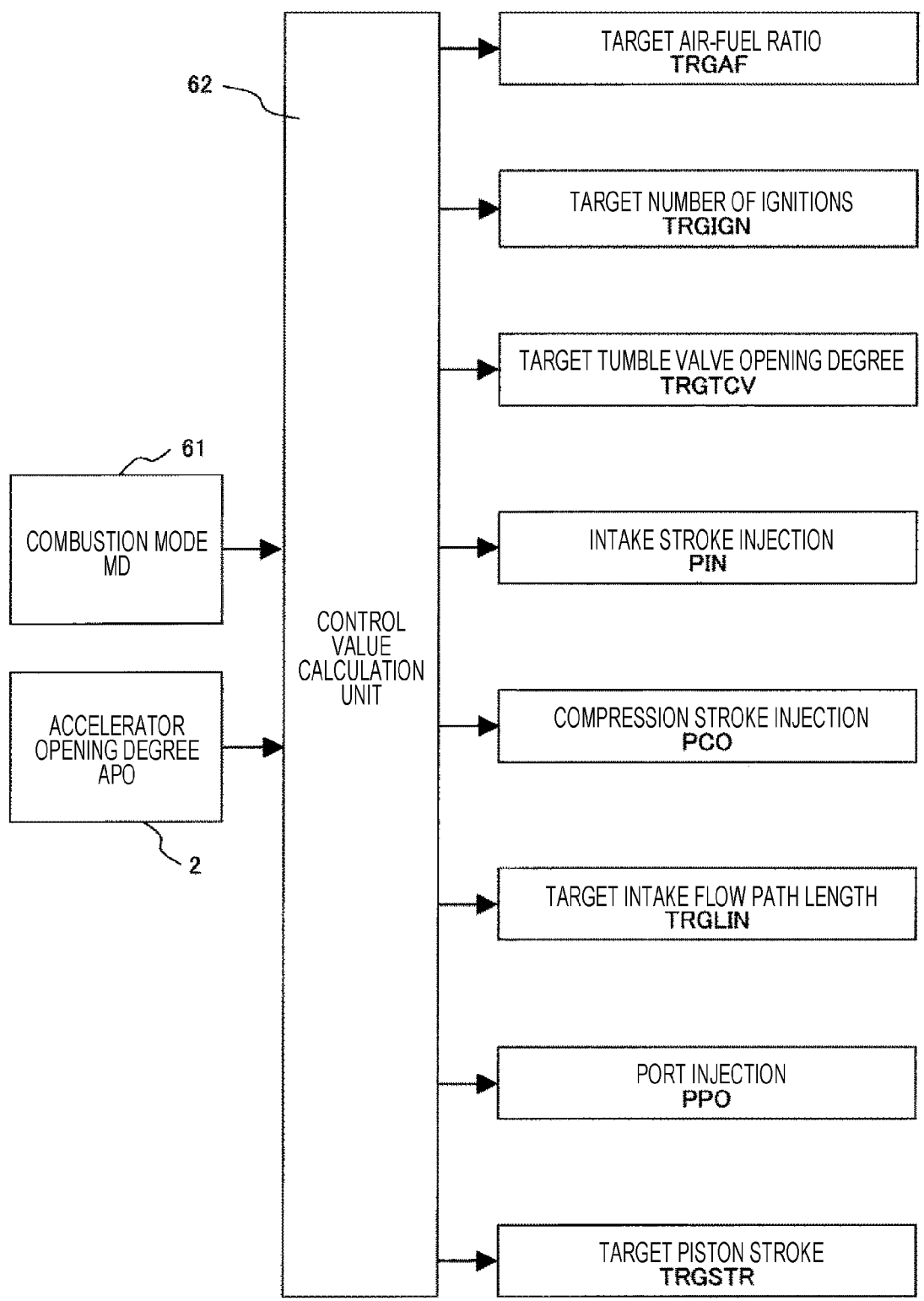
FIG. 6 is a block diagram of a control value arithmetic logic based on the combustion mode MD.

FIG. 6 shows an arithmetic logic which calculates each control target value shown in FIGS. 3 and 4 based on the combustion mode MD obtained in FIG. 5B. In addition, the arithmetic logic shown in FIG. 6 is expressed as a control function and is actually executed by the control program of a microcomputer provided in the electronic control means 1. The combustion mode MD and the accelerator opening degree information APO output from the combustion mode calculation unit 60 to the mode setting unit 61 are input to a control value calculation unit 62.

According to each combustion mode, the control value calculation unit 62 calculates and outputs the target air-fuel ratio TRGAF, the target number of ignitions TRGIGN, the target tumble control valve opening degree TRGTCV, the intake stroke injection PIN, the compression stroke injection PCO, the target intake flow path length TRGLIN, the port injection PPO, and the target piston stroke TRGSTR. Therefore, it is possible to output an appropriate target value corresponding to each combustion mode.

Next, a control of a transient state where the operation state is changed and the combustion mode is changed will be described. FIG. 7A shows the control value arithmetic logic of the transient state based on the combustion mode MD and the accelerator opening degree information APO. The arithmetic logic shown in FIG. 7A is expressed as a control function and is actually executed by the control program of a microcomputer provided in the electronic control means 1.

A control target value calculation unit 63 and a switching condition determination unit 64, which calculate each control target value with the combustion mode MD and the accelerator opening degree information APO as inputs, are provided inside the control value calculation unit 62 shown in FIG. 6, and a target value correction unit 65 is provided at a subsequent stage of the control target value calculation unit 63 and the switching condition determination unit 64. In the target value correction unit 65, the input from the control target value calculation unit 63 is corrected based on the input from the switching condition determination unit and is output from a target value output unit 66 as various target value outputs.

Here, the control of the transient state corresponding to the combustion mode MD and the accelerator opening degree information APO will be described with reference to FIG. 7B. For example, when the combustion mode MD changes from the "MD=1" to the "MD=2", a degree of change ΔL of the transient state is determined according to a magnitude of a change amount of the accelerator opening degree information APO, and a transient state correction function which obtains the magnitude of the correction amount according to the degree of change ΔL is provided in the target value correction unit 65.

The degree of change ΔL of the transient state can be determined from the accelerator opening degree information APO, and can be obtained by ΔL=APO(n)-APO(n−1), for example. Where APO(n) is an acquisition value of a current APO and APO(n−1) is an acquisition value of the APO before a predetermined time. In addition, for example, the degree of change ΔL of the transient state is not a change amount of the accelerator opening degree information APO but may be a change amount of a load (a value obtained by dividing an air volume by the rotation speed).

Accordingly, when there is a switching request between the stratified lean combustion mode and the homogeneous lean combustion mode, it is determined that whether the internal combustion engine is in the transient state and a correction amount (large/small) corresponding to the degree of change ΔL of the transient state can be reflected to the control target value, and thus, operation performance without discomfort can be obtained. Of course, the combustion stability is improved, and thus, it goes without saying that the exhaust purification performance and fuel consumption performance can be improved.

As shown in an upper side of FIG. 7B, in a case where the value of the combustion mode MD is switched from the "MD=1" to the "MD=2", from the "MD=1" to the "MD=3", from the "MD=2" to the "MD=3", from the "MD=2" to the "MD=4", and from the "MD=3" to the "MD=4", the correction amount which corrects the control target value based on the change amount of the accelerator opening degree information APO at this time is obtained. Similarly, as shown in a lower side of FIG. 7B, in a case where the value of the combustion mode MD is switched from the "MD=2" to the "MD=1", from the "MD=3" to the "MD=1", from the "MD=3" to the "MD=2", from the "MD=4" to the "MD=2", and from the "MD=4" to the "MD=3", the correction amount which corrects the control target value based on the change amount of the accelerator opening degree information APO at this time is obtained.

Here, it is determined whether the change amount of the accelerator opening degree information APO is larger or smaller than a predetermined reference change amount, and on the basis of this determination, it is determined whether the correction amount increases or decrease. However, a plurality of reference change amounts of the accelerator opening degree information APO are set, and according to this, the correction amounts can be set to a plurality of magnitudes. That is, as the change amount of the accelerator opening degree increases, the correction amount is set to be larger based on this.

Next, a control flow in the electronic control means 1 according to the above-described embodiment will be described with reference to FIG. 8. In addition, as described above, control contents of a calculation block shown in FIGS. 5A, 6, and 7A are repeatedly performed at a predetermined period by the control program which executes the control flow shown in FIG. 8.

Figure 8:
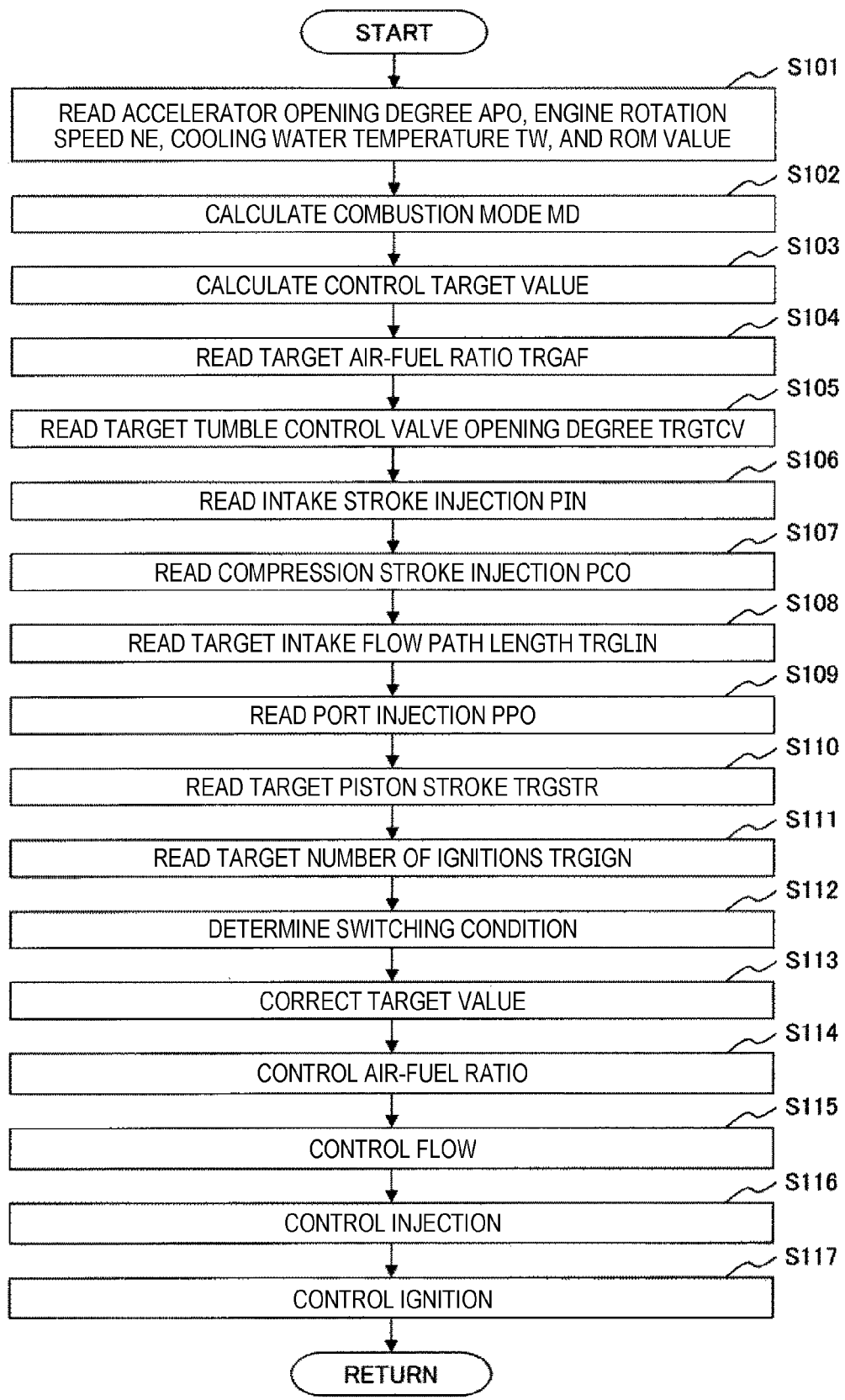
FIG. 8 is a flowchart showing a control flow which is an embodiment of the present invention.

In FIG. 8, in Step S101, the detection values of the accelerator opening degree information APO, the rotation speed information NE of the internal combustion engine, the cooling water temperature information TW, or the like, and the value written in the ROM of the electronic control means 1 are read. Next, in Step S102, the combustion mode MD is calculated. The calculation of the combustion mode MD is calculated from the determination table shown in FIG. 5B from the accelerator opening degree information APO, the rotation speed information NE, and the cooling water temperature information TW.

If the combustion mode MD is obtained, next, the control target value is calculated in Step S103. In the control target value, as shown in FIG. 6, the target air-fuel ratio TRGAF, target tumble control valve opening degree TRGTCV, the target intake flow path length TRGLIN, the target piston stroke TRGSTR, the intake stroke injection PIN, the compression stroke injection PCO, and the port injection PPO shown in FIGS. 3 and 4 are obtained by the control value calculation unit 62 to which the combustion mode MD and the accelerator opening degree information APO are input.

Next, in Step S104, the target air-fuel ratio TRGAF obtained in Step S103 is read. Hereinafter, similarly, the target tumble control valve opening degree TRGTCV is read in Step S105, the intake stroke injection PIN is read in Step S106, the compression the stroke injection PCO is read in Step S107, the target intake flow path length TRGLIN is read in Step S108, the port injection PPO is read in Step S109, the target piston stroke TRGSTR is read in Step S110, and finally, the target number of ignitions TRGIGN is read in Step S111.

Next, in Step S112, a switching condition such as how the combustion mode MD is changed and how much the change amount of the accelerator opening degree information APO is as shown in FIG. 7B is determined from the combustion mode MD and the accelerator opening degree information APO shown in FIG. 7A.

In addition, in Step S113, the correction amount for correcting the control target value shown in FIG. 7B is obtained, and the control target value is corrected by the correction amount.

Next, each control is performed based on each control target value corrected in the Step S113. In this case, in the present embodiment, the air control system is performed first, and then, the fuel control system is performed. Accordingly, it is possible to perform a correct air-fuel ratio control.

First, in Step S114, the air-fuel ratio control (any one of the stratified lean combustion mode/the homogeneous lean combustion mode/the stoichiometric combustion mode) is performed. Next, in Step S115, the air flow control is performed according to the combustion mode MD, and specifically, the tumble control valve opening degree control (any one of an open state and a closed state), the piston stroke control (any one of large/medium/small), and the flow path length control (any one of long and short) are performed.

Next, in step S116, the fuel injection control is performed according to the combustion mode MD, and specifically, the intake stroke injection (anyone of ON/OFF), the compression stroke injection (any one of ON/OFF), and the port injection (any one of ON/OFF) are performed. Next, in Step S117, the ignition control is performed, and specifically, the controls of the number of ignitions, the ignition energy and the ignition coil charging time are performed.

As described above, by performing the air control system prior to the fuel control system and reflecting the degree of change of the transient state, an accurate air-fuel ratio control corresponding to a temporal flow delay of the intake air can be realized, and an appropriate ignition control corresponding to the air-fuel ratio of the combustion mode can be performed.

Figure 9:
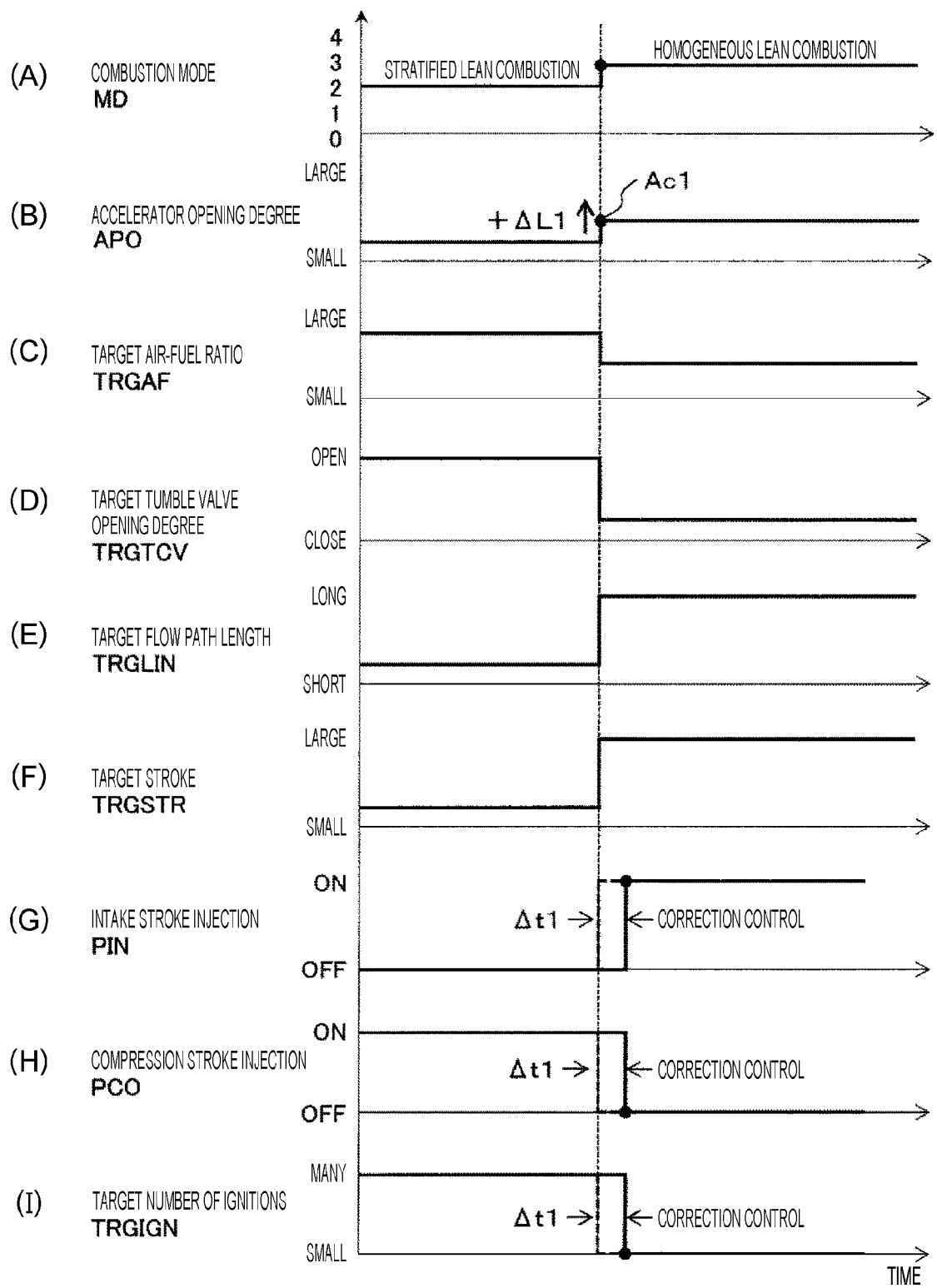
FIG. 9 is an explanatory diagram explaining a control of a case where a mode is switched from a stratified lean combustion mode to a homogeneous lean combustion mode and a degree of change in the transient state is small.

Next, some specific control examples of the above-described control flow will be described. FIG. 9 is a control example in a case where the accelerator pedal is depressed for acceleration, the combustion mode MD is switched from the "MD=2" to the "MD=3" and the degree of change is small such as "+ΔL1". In addition, from FIG. 5B, the "MD=2" is the stratified lean combustion mode and the "MD=3" is the homogeneous lean combustion mode.

(A) of FIG. 9 is the combustion mode MD, (B) of FIG. 9 is the accelerator opening degree information APO, (C) of FIG. 9 is the target air-fuel ratio TRGAF, (D) of FIG. 9 is the target tumble control valve opening degree TRGTCV, (E) of FIG. 9 is the target intake flow path length TRGLIN, (F) of FIG. 9 is the target piston stroke TRGSTR, (G) of FIG. 9 is the intake stroke injection PIN, (H) of FIG. 9 is the compression stroke injection PCO, (I) of FIG. 9 is the target number of ignitions TRGIGN, and a change state when the combustion mode MD is switched from the "MD=2" to the "MD=3" is shown. Moreover, also in FIGS. 10 to 12 described below, similarly, a change state of each operation amount when the combustion mode is switched is shown.

When the combustion mode MD is switched from the "MD=2" to the "MD=3", the combustion mode is switched from the stratified lean combustion mode to the homogeneous lean combustion mode. In addition, since the accelerator opening degree information APO is a small change amount as shown by "Ac1" of a sign "•", it can be regarded that the degree of change +ΔL1 is small. In addition, the degree of change +ΔL1 can be expressed by the change amount of the accelerator opening degree information APO within a predetermined time as described above.

In addition, the target air-fuel ratio is set to be small (rich side) in synchronization with a timing when the mode is switched to the homogeneous lean combustion mode, and similarly, as shown in (D) to (F) of FIG. 9 in synchronization with the switching timing, each of the target tumble control valve opening degree TRGTCV, the target intake flow path length TRGLIN, and the target piston stroke TRGSTR, which are included in the air control system, is controlled so as to be immediately changed to the control target value in the homogeneous lean combustion mode. That is, the tumble control valve 6 is controlled in a closing direction, the intake pipe is controlled such that the intake flow path length is lengthened, and the piston stroke is switched to be increased. Here, as the ratio of the fuel injection amount to the intake air amount increases, the opening degree of the tumble control valve 6 is set to be increased and the piston stroke can be set to be decreased.

In addition, after a short delay time Δt1 corresponding to the degree of change +ΔL1 of the transient state elapses later than the timing when the switching operation of the combustion mode MD or the switching operation of the air control system is performed, the fuel control system performs a control for changing the intake stroke injection PIN, the compression stroke injection PCO, and the target number of ignitions TRGIGN. That is, the intake stroke injection PIN is turned ON and the intake stroke injection is performed while the compression stroke injection is turned OFF and the compressed stroke injection is stopped after the delay time Δt1 elapses after the switching operation of the combustion mode MD or after the switching operation of the air control system. In addition, the number of ignitions is set to be smaller than that of the stratified lean combustion mode, and the ignition energy is controlled to be increased.

For this reason, the flow state (strong flow) of the air required in the homogeneous lean combustion mode can be strengthened prior to the fuel injection in consideration of the response delay of the air. Accordingly, compared to a case where the compression stroke injection PCO is stopped immediately in synchronization with the switching operation of the combustion mode MD and the intake stroke injection is performed, the fuel injection is performed when the flow state of the air is the strong flow, and thus, homogenization of the mixture is improved, the air-fuel ratio in the homogeneous lean combustion mode can be set highly, and it is possible to increase the exhaust purification performance and the fuel consumption performance.

Figure 10:
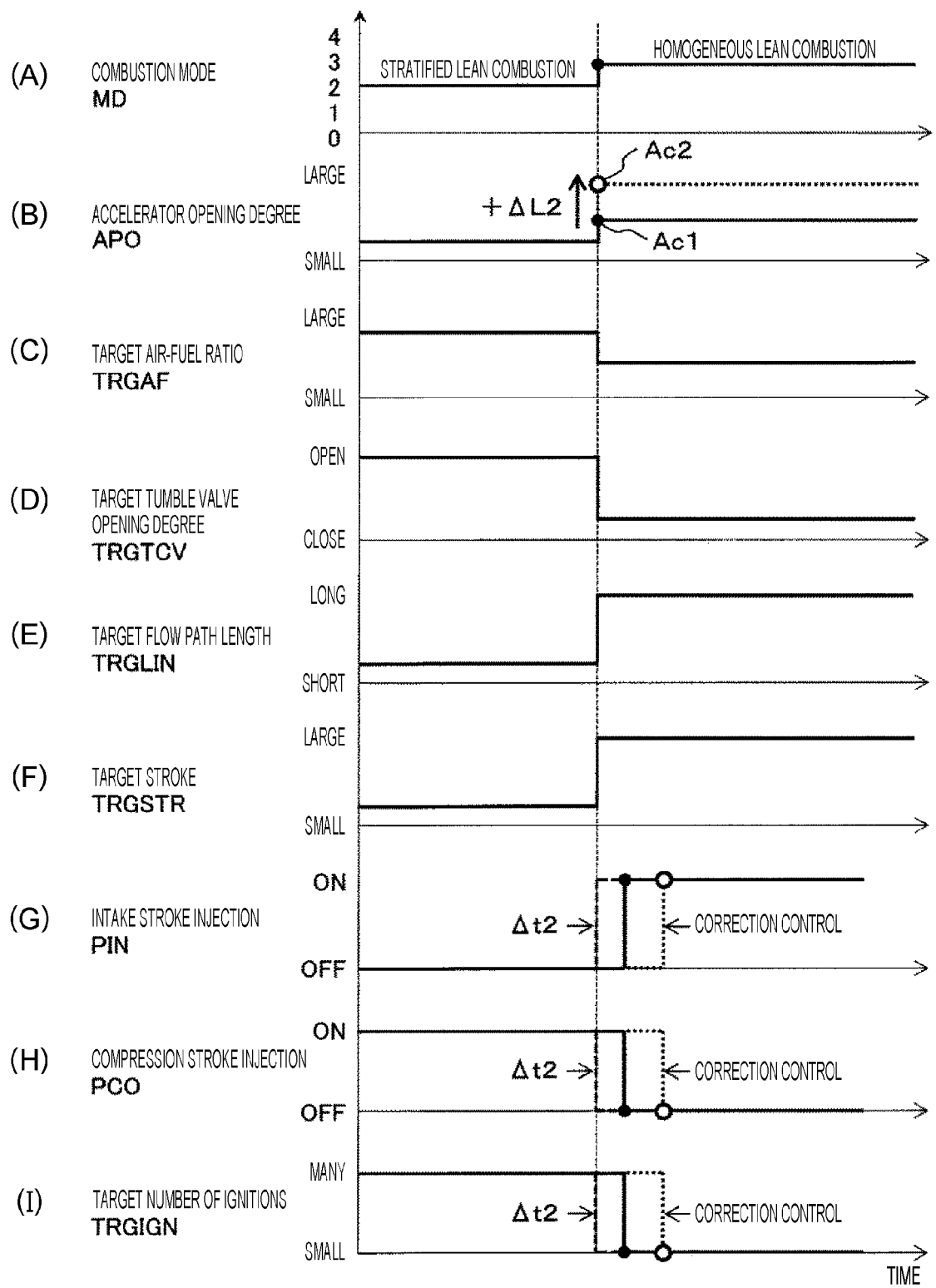
FIG. 10 is an explanatory diagram explaining a control of a case where the mode is switched from the stratified lean combustion mode to the homogeneous lean combustion mode and the degree of change in the transient state is large.

Next, FIG. 10 is a control example in a case where the accelerator pedal is depressed for acceleration, the combustion mode MD is switched from the "MD=2" to the "MD=3" and the degree of change is large such as "+ΔL2". If the combustion mode MD is switched from the "MD=2" to the "MD=3", as described above, the combustion mode is changed from the stratified lean combustion mode to the homogeneous lean combustion mode.

In this case, compared to the case of FIG. 9, since the accelerator opening degree information APO is a large change amount as shown by "Ac2" of a sign "o", it can be regarded that the degree of change +ΔL2 is large. In this case, the target air-fuel ratio is set to be small (rich side), and as shown in (D) to (F) of FIG. 10, each of the target tumble control valve opening degree TRGTCV, the target intake flow path length TRGLIN, and the target piston stroke TRGSTR, which are included in the air control system, is controlled so as to be immediately changed to the target value in the homogeneous lean combustion mode. This is similar to FIG. 9.

Meanwhile, after a long delay time Δt2 corresponding to the degree of change +ΔL2 of the transient state elapses later than the timing when the switching operation of the combustion mode MD or the switching operation of the air control system is performed, the fuel control system performs the control for changing the intake stroke injection PIN, the compression stroke injection PCO, and the target number of ignitions TRGIGN. That is, the intake stroke injection PIN is turned ON and the intake stroke injection is performed while the compression stroke injection is turned OFF and the compression stroke injection is stopped after the delay time Δt2 elapses after the switching operation of the combustion mode MD or after the switching operation of the air control system. In addition, the number of ignitions is set to be smaller than that of the stratified lean combustion mode, and the ignition energy is controlled to be increased.

Moreover, in the present embodiment, the delay time Δt2 corresponding to the degree of change +ΔL2 is exemplarily set. In short, as the change amount of the accelerator opening degree increases, the delay time is also set so as to increase based on the increase in the change amount.

For this reason, the flow state (strong flow) of the air required in the homogeneous lean combustion mode can be strengthened prior to the fuel injection in consideration of the response delay of the air. Accordingly, compared to the case where the compression stroke injection PCO is stopped immediately in synchronization with the switching operation of the combustion mode MD and the intake stroke injection is performed, the fuel injection is performed when the flow state of the air is the strong flow, and thus, the homogenization of the mixture is improved, the air-fuel ratio in the homogeneous lean combustion mode can be set highly, and it is possible to increase the exhaust purification performance and the fuel consumption performance.

In addition, as shown in (B) of FIG. 10, since the change amount of the accelerator opening degree information APO is in a large acceleration required state in a positive direction, by increasing the delay time Δt2 for performing the compression stroke injection PCO, the amount of the supplied fuel increases, and it is possible to improve the acceleration. In addition, in a case where it is applied to an internal combustion engine equipped with a turbocharger, an exhaust enthalpy increases according to the exhaust temperature increases due to an increase in the delay time Δt2 of the compression stroke injection PCO, and it is possible to rapidly increase an intake pressure by increasing a turbo response. As a result, it is possible to improve the fuel consumption performance.

Figure 11:
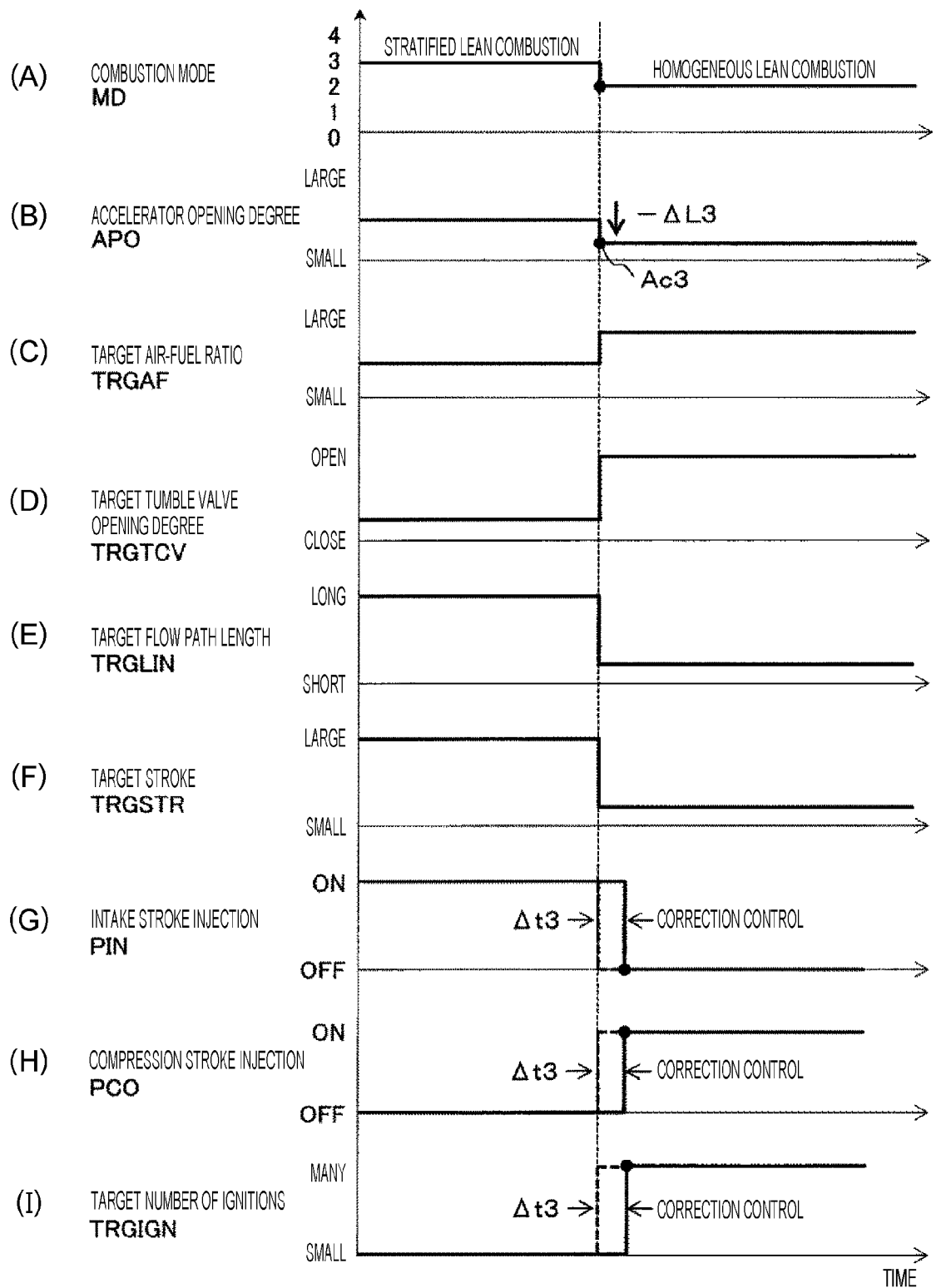
FIG. 11 is an explanatory diagram explaining a control of a case where the mode is switched from the homogeneous lean combustion mode to the stratified lean combustion mode and the degree of change in the transient state is small.

Next, a control example shown in FIG. 11 is a control example in a case where the accelerator pedal is stepped on for deceleration, the combustion mode MD is switched from the "MD=3" to the "MD=2", and the degree of change is small such as "−ΔL1". In addition, also in this case, from FIG. 5B, the "MD=3" is the homogeneous lean combustion mode, and the "MD=2" is the stratified lean combustion mode.

Similarly to FIG. 9, FIG. 11 shows the change state when the combustion mode MD is changed from the "MD=3" to the "MD=2". In addition, when the combustion mode MD is changed from the "MD=3" to the "MD=2", the combustion mode is switched from the homogeneous lean combustion mode to the stratified lean combustion mode. In addition, since the accelerator opening degree information APO is a small change amount as shown by "Ac3" of a sign "•", it can be regarded that the degree of change −ΔL3 is small. In this time, the target air-fuel ratio is set to be large (lean side) in synchronization with the switching time, and similarly, as shown in (D) to (F) of FIG. 11, each of the target tumble control valve opening degree TRGTCV, the target intake flow path length TRGLIN, the target piston stroke TRGSTR, which are included in the air control system, is controlled so as to be immediately changed to the control target value in the stratified lean combustion mode. That is, the tumble control valve 6 is controlled in an open direction, the intake pipe is switched such that the intake flow path length is shortened, and the piston stroke is switched to be decreased.

In addition, after a short delay time Δt3 corresponding to the degree of change −ΔL3 of the transient state elapses later than the timing when the switching operation of the combustion mode MD or the switching operation of the air control system is performed, the fuel control system performs a control for changing the intake stroke injection PIN, the compression stroke injection PCO, and the target number of ignitions TRGIGN. That is, the intake stroke injection PIN is turned OFF and the intake stroke injection is stopped while the compression stroke injection is turned ON and the injection stroke injection is performed after the delay time Δt3 elapses after the switching operation of the combustion mode MD or after the switching operation of the air control system. In addition, the number of ignitions is set to be larger than that of the homogeneous lean combustion mode, a plurality of times of ignition opportunities can be provided, it is possible to improve robustness of the ignition, and it is possible to improve ignitability.

For this reason, the flow state (weak flow) required in the stratified lean combustion mode can be weakened prior to the fuel injection in consideration of the response delay of the air. Accordingly, compared to a case where the intake stroke injection is stopped immediately in synchronization with the switching operation of the combustion mode MD and the compression stroke injection is performed, the flow state of the air is a weak flow, and thus, diffusion of the mixture is suppressed, the air-fuel ratio in the stratified lean combustion mode can be set highly, and it is possible to increase the exhaust purification performance and the fuel consumption performance.

Figure 12:
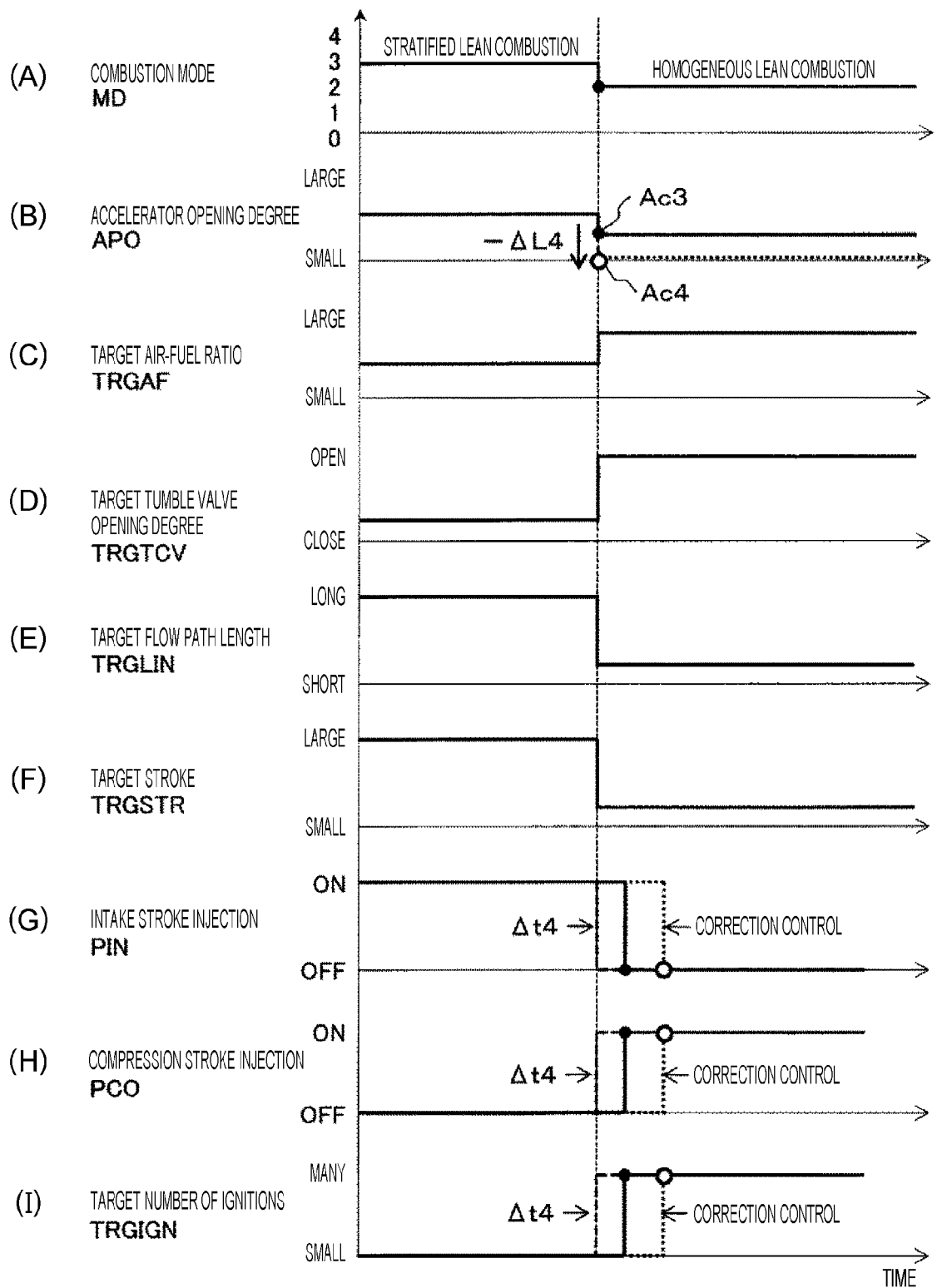
FIG. 12 is an explanatory diagram explaining a control of a case where the mode is switched from the homogeneous lean combustion mode to the stratified lean combustion mode and the degree of change in the transient state is large.

Next, FIG. 12 is a control example in a case where the combustion mode MD is switched from the "MD=3" to the "MD=2" and the degree of change of the transient state increases. If the combustion mode MD is switched from the "MD=3" to the "MD=2", as described above, the combustion mode is changed from the homogeneous lean combustion mode to the stratified lean combustion mode.

In this case, compared to the case of FIG. 11, since the accelerator opening degree information APO is a large change amount as shown by "Ac4" of a sign "o", it can be regarded that the degree of change −ΔL4 is large. In this case, the target air-fuel ratio is set to be large (lean side), and shown in (D) to (F) of FIG. 12, each of the target tumble control valve opening degree TRGTCV, the target intake flow path length TRGLIN, and the target piston stroke TRGSTR which are included in the air control system is controlled so as to be immediately changed to the target value in the stratified lean combustion. This is similar to FIG. 11.

Meanwhile, after a long delay time Δt4 corresponding to the degree of change −ΔL4 of the transient state elapses later than the timing when the switching operation of the combustion mode MD or the switching operation of the air control system is performed, the fuel control system performs the control for changing the intake stroke injection PIN, the compression stroke injection PCO, and the target number of ignitions TRGIGN. That is, the intake stroke injection PIN is turned OFF and the intake stroke injection is stopped while the compression stroke injection is turned ON and the compression stroke injection is performed after the delay time Δt4 elapses after the switching operation of the combustion mode MD or after the switching operation of the air control system. In addition, the number of ignitions is set to be larger than that of the homogeneous lean combustion mode, a plurality of times of ignition opportunities can be provided, it is possible to improve robustness of the ignition, and it is possible to improve ignitability.

Moreover, in the present embodiment, similarly to FIG. 10, the delay time Δt4 corresponding to the degree of change −ΔL4 is exemplarily set. In short, as the change amount of the accelerator opening degree increases, the delay time is also set so as to increase based on the increase in the change amount.

For this reason, the flow state (weak flow) of the air required in the stratified lean combustion mode can be weakened prior to the fuel injection in consideration of the response delay of the air. Accordingly, compared to the case where the fuel injection is stopped immediately in synchronization with the switching operation of the combustion mode MD, the flow state of the air is the weak flow, and thus, the diffusion of the mixture is suppressed, the air-fuel ratio in the stratified lean combustion mode can be set highly, and it is possible to increase the exhaust purification performance and the fuel consumption performance.

In addition, as shown in (B) of FIG. 12, since the change amount of the accelerator opening degree information APO is in a large deceleration demand state in a negative direction, by increasing the delay time Δt4 of the intake stroke injection PIN, the fuel injection can be completed earlier than the compression stroke injection PCO, homogeneity of the mixture can be secured, and it is possible to improve the exhaust purification performance.

Characteristic configurations which can be ascertained from the above-described embodiment will be described below.

(1) When the switching from the stratified lean combustion mode to the homogeneous lean combustion mode is performed, with respect to a stop timing of the compression stroke injection, a performance timing of the intake stroke injection, and a timing when the number of ignitions decreases, the timing when the tumble control valve is controlled in the closing direction, the timing when the piston stroke is controlled in an increase direction, or the timing when the intake pipe length is lengthened is controlled to be earlier than the time set so as to correspond to the degree of change of the transient state, and thus, it is possible to shorten a delay of the air with respect to the fuel injection or to synchronize the air injection and the fuel injection.

(2) In a case of the switching from the stratified lean combustion mode in which the compression stroke injection is performed to the homogeneous lean combustion mode in which the intake stroke injection is performed, the tumble control valve is closed, the intake pipe flow path length is lengthened, or the piston stroke increases. The compression stroke injection stops after the predetermined delay time corresponding to the magnitude of the degree of change of the transient state elapses, the intake stroke injection is performed, and the number of ignitions of the spark plug decreases. Accordingly, it is possible to perform flow strengthening in consideration of the response delay of the air, it is possible to stop the compression stroke injection after a stability condition of the homogeneous lean combustion is satisfied, and thus, it is possible to avoid homogeneous leaning with a weak flow, and it is possible to improve both the exhaust purification performance and the fuel consumption performance.

(3) In a case of the switching from the stratified lean combustion mode in which the compression stroke injection mode is performed to the homogeneous lean combustion in which the intake stroke injection is performed, if the opening degree of the accelerator pedal is changed toward an opening side to be equal to or more than a set value, after the tumble control valve is closed, the intake flow path length is lengthened, or the piston stroke increases, the intake stroke injection is performed and the compression stroke injection is stopped at a timing when the delay time corresponding to the magnitude of the degree of change of the opening degree of the accelerator pedal elapses, and the number of ignitions of the spark plug is decreased. Accordingly, with respect to an acceleration request from the driver at the time of the combustion switching, it is possible to immediately create a flow state in the homogeneous lean combustion and to achieve a homogeneous lean acceleration under a high load.

(4) In a case of the switching from the homogeneous lean combustion mode in which the intake stroke injection is performed to the stratified lean combustion mode in which the compression stroke injection is performed, the tumble valve is opened, the intake flow path length is shortened, or the piston stroke decreases. The intake stroke injection stops after the predetermined delay time corresponding to the magnitude of the degree of change of the transient state elapses, the compression stroke injection is performed, and the number of ignitions of the spark plug increases. Accordingly, it is possible to perform flow suppression in consideration of the response delay of the air, it is possible to start the compression stroke injection after a stability condition of the stratified lean combustion is satisfied, and thus, it is possible to avoid stratified leaning with a strong flow, and it is possible to improve both the exhaust purification performance and the fuel consumption performance.

(5) In a case of the switching from the homogeneous lean combustion mode in which the intake stroke injection is performed to the stratified lean combustion mode in which the compression stroke injection is performed, if the accelerator opening degree is changed toward a closing side to be equal to or more than a set value, after the tumble control valve is opened, the intake flow path length is shortened, or the piston stroke decreases, the compression stroke injection is performed and the intake stroke injection is stopped at a timing when a predetermined delay time corresponding to the magnitude of the degree of change of the opening degree of the accelerator pedal elapses, and the number of ignitions of the spark plug is increased. Accordingly, with respect to a deceleration request from the driver at the time of the combustion switching, it is possible to immediately create a flow state in the stratified lean combustion and to achieve a stratified lean deceleration under a low load.

(6) As the ratio of the fuel injection amount to the intake air amount increases, the opening degree of the tumble valve control is set to be increased and the piston stroke is set to be decreased. Accordingly, it is possible to further improve both the exhaust purification performance and the fuel consumption performance while realizing the combustion stabilization of each of the stratified lean combustion and the homogeneous lean combustion.

(7) The port injection injector which injects the fuel into the intake port and the direct injection injector which injects the fuel into the combustion chamber are provided, the mixture is formed around the spark plug by stopping the fuel injection of the port injection injector in the stratified lean combustion mode in which the compression stroke injection is performed by the direct injection injector, a highly homogeneous mixture is formed in the combustion chamber in the homogeneous lean combustion by performing the fuel injection of the port injection injector in the homogeneous lean combustion mode in which the intake stroke injection is performed by the direct injection injector, the fuel is injected from the direct injection injector at the intake stroke, and thus, it is possible to avoid an abnormal combustion such as knocking.

As described above, according to the present invention, when switching between the stratified lean combustion mode in which the compression stroke injection is performed and the homogeneous lean combustion mode in which the intake stroke injection is performed is performed, the switching operation between the compression stroke injection and the intake stroke injection is performed after the predetermined delay time elapses from the switching operation of the air control system corresponding to the stratified lean combustion mode and the homogeneous lean combustion mode, and the delay time is set so as to correspond to the magnitude of the degree of change of the transient state.

Accordingly, a switching timing between the compression stroke injection and the intake stroke injection is controlled according to the flow delay of the air control system such as the tumble control valve and the degree of change of the transient state, and thus, it is possible to improve the combustion stability in the combustion chamber.

The present invention is not limited to the above-described embodiment, but includes various modification examples. For example, the above-described embodiment is described in detail in order to explain the present invention in an easy-to-understand manner, and is not necessarily limited to those having all the configurations described. In addition, it is possible to replace some of configurations of an embodiment with configurations of another embodiment, and it is possible to add configurations of another embodiment to configurations of an embodiment.

REFERENCE SIGNS LIST 1 electronic control means
2 accelerator pedal opening degree sensor
3 air flow sensor
4 intake air temperature/humidity sensor
5 throttle
6 tumble control valve
7 direct injection injector
8 fuel pump
9 common rail
10 fuel pipe
11 intake pipe
12 variable valve mechanism
13 piston
14 crankshaft
15 crank angle sensor
16 knock sensor
17 combustion chamber 18 cooling water temperature sensor
19 spark plug
20 ignition coil
21 pressure sensor (ion current sensor)
22 exhaust pipe
23 three-way catalyst
24 exhaust temperature sensor
25 air-fuel ratio sensor
26 EGR valve
27 EGR cooler
28 exhaust recirculation pipe
29 cooling water pump
30 cooling water flow path switching valve
31 control shaft
32 G sensor
33 port injector
34 intake pipe length adjustment valve
Eng internal combustion engine

The invention claimed is:

1. An internal combustion engine control device which is used in an internal combustion engine for injecting a fuel from a direct injection injector to a combustion chamber and includes a microcomputer having a control program programmed to cause operations to be performed including switching between a stratified lean combustion mode in which a compression stroke injection is performed and a homogeneous lean combustion mode in which an intake stroke injection is performed,
wherein when the switching between the stratified lean combustion mode and the homogeneous lean combustion mode is performed, the microcomputer performs a switching operation between the compression stroke injection and the intake stroke injection after a predetermined delay time elapses from a switching operation of an air control system corresponding to the stratified lean combustion mode and the homogeneous lean combustion mode, and the microcomputer further sets the predetermined delay time such that the predetermined delay time corresponds to a magnitude of a degree of change of a transient state, and
wherein the transient state is determined based on a magnitude of a change amount of accelerator opening degree (APO) information and a transient state correction amount,
wherein the transient state correction amount corrects a calculated control target value associated with the APO information, wherein the calculated control target value is based on a calculated combustion mode value, the calculated combustion mode value calculated using a determination table and being based on a coolant temperature, an APO, and a rotation speed satisfying one or more stored permission conditions, and
wherein each of the one or more permission conditions correspond to the stratified lean combustion mode or the homogeneous lean combustion mode.

2. The internal combustion engine control device according to claim 1, wherein the air control system includes one or more of a tumble control valve, an intake flow path length changing mechanism, and a piston stroke changing mechanism, and
the microcomputer performs at least one of an air control of closing an opening degree of the tumble control valve, an air control of lengthening an intake flow path length by the intake flow path length changing mechanism, and an air control of increasing a piston stroke by the piston stroke changing mechanism, in synchronization with a switching timing from the stratified lean combustion mode to the homogeneous lean combustion mode, and the microcomputer performs switching from the compression stroke injection to the intake stroke injection when the predetermined delay time elapses after the air control is performed.

3. The internal combustion engine control device according to claim 2, wherein the microcomputer having the control program performs an ignition control by a plurality of times of ignition in the stratified lean combustion mode and decreases the number of ignitions so as to perform the ignition control when the switching from the compression stroke injection to the intake stroke injection is performed.

4. The internal combustion engine control device according to claim 2, wherein an accelerator opening degree is input to the microcomputer, and
the microcomputer performs switching from the stratified lean combustion mode to the homogeneous lean combustion mode when the accelerator opening degree is changed by a predetermined change amount or more in an open direction, and as the change amount of the accelerator opening degree further increases, the microcomputer having the control program sets the predetermined delay time so that the predetermined delay time is lengthened based on the increase in the change amount.

5. The internal combustion engine control device according to claim 1, wherein the air control system includes one or more of a tumble control valve, an intake flow path length changing mechanism, and a piston stroke changing mechanism, and
the microcomputer performs at least one of an air control of opening the tumble control valve, an air control of shortening an intake flow path length by the intake flow path length changing mechanism, and an air control of decreasing a piston stroke by the piston stroke changing mechanism, in synchronization with a switching time from the homogeneous lean combustion mode to the stratified lean combustion mode, and the microcomputer performs switching from the compression stroke injection to the intake stroke injection when the predetermined delay time elapses after the air control is performed.

6. The internal combustion engine control device according to claim 5, wherein the microcomputer performs an ignition control by at least once of ignition in the homogeneous lean combustion mode and increases the number of ignitions so as to perform the ignition control when the switching from the intake stroke injection to the compression stroke injection is performed.

7. The internal combustion engine control device according to claim 5, wherein an accelerator opening degree is input to the microcomputer, and
the microcomputer performs switching from the homogeneous lean combustion mode to the stratified lean combustion mode when the accelerator opening degree is changed by a predetermined change amount or more in a closing direction, and as the change amount of the accelerator opening degree further increases, the microcomputer sets the delay time such that the delay time is lengthened based on the increase in the change amount.

8. The internal combustion engine control device according to claim 1, wherein the internal combustion engine includes a port injection injector which injects the fuel into an intake port,
in the stratified lean combustion mode, the microcomputer stops the fuel injection of the port injection injector to form a mixture around a spark plug by the compression stroke injection, and in the homogeneous lean combustion mode in which the intake stroke injection is performed, the microcomputer performs the fuel injection from the port injection injector and performs an additional fuel injection from the direct injection injector at the intake stroke.

9. The internal combustion engine control device according to claim 1, wherein the APO is determined based on a first acquisition value at a current point in time and a second acquisition value at a predetermined time before the current point in time.

10. The internal combustion engine control device according to claim 1, wherein the APO is determined based on a change amount of a load, wherein the change amount of the load is based on an air volume and the rotation speed.

* * * * *